US012570122B2

(12) United States Patent
Harney et al.

(10) Patent No.: US 12,570,122 B2
(45) Date of Patent: Mar. 10, 2026

(54) ZERO CARBON EMISSION AND HIGHLY EFFICIENT INTELLIGENT HYDROGEN-POWERED REFRIGERATION SYSTEM FOR TRANSPORTATION

(71) Applicant: H2CS HYDRO COOL SYSTEMS LIMITED, Toronto (CA)

(72) Inventors: William Joseph John Harney, Toronto (CA); Pierre-Xavier Pascal Roy, Toronto (CA); Yevheni Zotkin, Khmelnitsky (UA)

(73) Assignee: H2CS HYDRO COOL SYSTEMS LIMITED, Toronto (CA)

( * ) Notice: Subject to any disclaimer, the term of this patent is extended or adjusted under 35 U.S.C. 154(b) by 139 days.

(21) Appl. No.: 18/506,511

(22) PCT Filed: May 17, 2022

(86) PCT No.: PCT/IB2022/054588
§ 371 (c)(1),
(2) Date: Nov. 10, 2023

(87) PCT Pub. No.: WO2022/243876
PCT Pub. Date: Nov. 24, 2022

(65) Prior Publication Data
US 2025/0058602 A1 Feb. 20, 2025

Related U.S. Application Data

(60) Provisional application No. 63/189,435, filed on May 17, 2021.

(51) Int. Cl.
B60H 1/00 (2006.01)

(52) U.S. Cl.
CPC ..... B60H 1/00392 (2013.01); B60H 1/00364 (2013.01); B60H 1/00771 (2013.01);
(Continued)

(58) Field of Classification Search
CPC ............ B60H 1/00392; B60H 1/00364; B60H 1/00771; B60H 2001/00307; B60H 2001/00928
(Continued)

(56) References Cited

U.S. PATENT DOCUMENTS 4,085,709 A 4/1978 Tangri
4,441,326 A 4/1984 Bernauer et al.
(Continued)

FOREIGN PATENT DOCUMENTS

CA 2075724 C 7/1995
CA 2322871 A1 9/1999
(Continued)

OTHER PUBLICATIONS

English Translation of CN Publication No. 104602926 May 6, 2015.
(Continued)

*Primary Examiner* — Davis D Hwu
(74) *Attorney, Agent, or Firm* — Smart & Biggar LP

(57) ABSTRACT

A hydrogen-powered refrigeration system 900 and related intelligent and predictive control methods, comprises various subsystems integrated to create synergies and interdependencies providing high efficiency, mission anticipation and recommendations to minimize fuel consumption and increase the durability of the system while refrigerating a cargo volume during transportation at low or no carbon emissions; wherein the intelligent and predictive controls are achieved by the use of a control system based on deep neural networks that optimizes operation by anticipating the future state of the system and adjusting its configuration based on models to operate under an optimal control policy that considers external information obtained from calls to APIs linked to external information providers while ensuring cargo is maintained under conditions required or regulated
(Continued)

as a part of the cold chain. The invention has particular application to the vehicular and multi-modal transportation of items requiring refrigeration.

26 Claims, 21 Drawing Sheets

(52) U.S. Cl.
CPC .............. *B60H 2001/00307* (2013.01); *B60H 2001/00928* (2013.01)
(58) Field of Classification Search
USPC ........................................................ 165/202
See application file for complete search history.

(56) References Cited

U.S. PATENT DOCUMENTS

| | | | |
|---|---|---|---|
| 5,465,586 | A | 11/1995 | Sjoholm et al. |
| 5,787,713 | A | 8/1998 | Russo |
| 6,223,546 | B1 | 5/2001 | Chopko et al. |
| 6,448,535 | B1 | 9/2002 | Ap |
| 6,751,963 | B2 | 6/2004 | Navedo et al. |
| 6,755,041 | B2 | 6/2004 | Wessells et al. |
| 6,861,169 | B2 | 3/2005 | Hagan et al. |
| 7,530,414 | B2 | 5/2009 | Kubusch et al. |
| 7,614,245 | B2 | 11/2009 | Matsui et al. |
| 8,117,969 | B1 | 2/2012 | Miller et al. |
| 8,286,437 | B2 | 10/2012 | Sanders et al. |
| 8,347,645 | B1 | 1/2013 | Miller |
| 8,877,274 | B2 | 11/2014 | Bell |
| 9,261,295 | B1 | 2/2016 | Schmidt et al. |
| 9,328,945 | B2 | 5/2016 | Arai et al. |
| 9,376,971 | B2 | 6/2016 | Luther et al. |
| 9,688,414 | B2 | 6/2017 | Burns et al. |
| 9,789,744 | B2 | 10/2017 | Steele et al. |
| 9,827,824 | B2 | 11/2017 | Enomoto et al. |
| 9,941,526 | B2 | 4/2018 | Kawai |
| 10,031,521 | B1 | 7/2018 | Newman |
| 10,240,847 | B1 | 3/2019 | Thomas, Jr. |
| 10,418,845 | B2 | 9/2019 | Srnec et al. |
| 10,493,861 | B2 | 12/2019 | Cur |
| 10,602,329 | B2 | 3/2020 | Addepalli et al. |
| 10,691,138 | B2 | 6/2020 | Antunes Marques Esteves |
| 10,723,201 | B2 | 7/2020 | Neu et al. |
| 10,775,085 | B2 | 9/2020 | Wallace et al. |
| 10,902,319 | B2 | 1/2021 | Toffe et al. |
| 11,022,451 | B2 | 6/2021 | Srnec et al. |
| 11,034,213 | B2 | 6/2021 | Wenger et al. |
| 11,072,321 | B2 | 7/2021 | Wenger et al. |
| 11,085,782 | B2 | 8/2021 | Adetola et al. |
| 11,118,833 | B2 | 9/2021 | Poolman et al. |
| 11,130,387 | B2 | 9/2021 | Adetola et al. |
| 11,155,143 | B2 | 10/2021 | Adetola et al. |
| 11,225,186 | B2 | 1/2022 | Lifson et al. |
| 2003/0019231 | A1 | 1/2003 | Wessells et al. |
| 2005/0029022 | A1 | 2/2005 | Kubusch et al. |
| 2005/0283548 | A1 | 12/2005 | Dudley et al. |
| 2006/0150652 | A1 | 7/2006 | Choi et al. |
| 2010/0251751 | A1 | 10/2010 | Lurken et al. |
| 2011/0030399 | A1 | 2/2011 | Lifson et al. |
| 2012/0304672 | A1 | 12/2012 | Betts et al. |
| 2012/0304673 | A1 | 12/2012 | Betts |
| 2013/0333396 | A1 | 12/2013 | Handley |
| 2014/0223933 | A1 | 8/2014 | Steele et al. |
| 2018/0111503 | A1 | 4/2018 | Araki et al. |
| 2018/0354339 | A1 | 12/2018 | Smith et al. |
| 2019/0128571 | A1 | 5/2019 | Poolman |
| 2019/0277647 | A1 | 9/2019 | Adetola et al. |
| 2020/0047587 | A1 | 2/2020 | Maeng |
| 2020/0164738 | A1 | 5/2020 | Renault |
| 2020/0207326 | A1 | 7/2020 | Wenger et al. |
| 2020/0346514 | A1 | 11/2020 | Saroka et al. |
| 2021/0080154 | A1 | 3/2021 | Moon et al. |
| 2021/0108854 | A1 | 4/2021 | Kim |
| 2021/0191342 | A1 | 6/2021 | Lee et al. |
| 2021/0268864 | A1 | 9/2021 | Saroka et al. |
| 2021/0292626 | A1 | 9/2021 | Ohkubo et al. |
| 2021/0300152 | A1 | 9/2021 | Wenger et al. |
| 2021/0318015 | A1 | 10/2021 | Nishino et al. |
| 2021/0328453 | A1 | 10/2021 | Vidal Clos et al. |

FOREIGN PATENT DOCUMENTS

| | | | | |
|---|---|---|---|---|
| CA | 2455350 | A1 | 12/2002 | |
| CA | 2523624 | A1 | 11/2004 | |
| CA | 2553374 | A1 | 7/2005 | |
| CA | 2570286 | A1 | 1/2006 | |
| CA | 2570289 | A1 | 6/2007 | |
| CA | 2918353 | A1 | 1/2015 | |
| CA | 2891435 | A1 | 12/2015 | |
| CA | 2958748 | A1 | 2/2016 | |
| CA | 2960800 | A1 | 3/2016 | |
| CA | 2911635 | C | 10/2017 | |
| CA | 3120040 | A1 | 5/2020 | |
| CN | 101279580 | A | 10/2008 | |
| CN | 104602926 | A | 5/2015 | |
| CN | 111391666 | A | 7/2020 | |
| DE | 102017100872 | A1 | 7/2017 | |
| EP | 1057668 | A2 | 12/2000 | |
| EP | 1279907 | A2 | 1/2003 | |
| EP | 1057668 | B1 | 1/2006 | |
| EP | 1803620 | A1 | 7/2007 | |
| EP | 1834818 | B1 | 9/2011 | |
| EP | 2528759 | B1 | 11/2014 | |
| EP | 2950671 | A1 | 12/2015 | |
| EP | 2703200 | B1 | 12/2016 | |
| EP | 3265383 | B1 | 5/2019 | |
| EP | 2494292 | B1 | 7/2019 | |
| EP | 3543046 | A1 | 9/2019 | |
| EP | 3790157 | A1 | 3/2021 | |
| ES | 2736774 | T3 | 1/2020 | |
| GB | 2524611 | A | 9/2015 | |
| JP | H07108909 | A | 4/1995 | |
| JP | 2005093374 | A | 4/2005 | |
| JP | 2005172395 | A * | 6/2005 | |
| JP | 5270076 | B2 | 8/2013 | |
| TW | 578324 | B | 3/2004 | |
| WO | 1998004011 | A3 | 1/1998 | |
| WO | 2009099429 | A1 | 8/2009 | |
| WO | 2012167093 | A2 | 12/2012 | |
| WO | 2016140988 | A1 | 9/2016 | |
| WO | WO2017074179 | A1 * | 5/2017 | ........... B60H 1/3232 |
| WO | WO2018102636 | A1 * | 6/2018 | ............ B60H 1/034 |
| WO | 2018226649 | A1 | 12/2018 | |
| WO | 2019028365 | A1 | 2/2019 | |
| WO | 2020/142066 | A1 | 7/2020 | |
| WO | 2022243876 | A1 | 11/2022 | |

OTHER PUBLICATIONS

English Translation of CN Publication No. 111391666 Jul. 10, 2020.
English Translation of DE Publication No. 102017100872 Jul. 27, 2017.
English Translation of Japanese Publication No. JPH07108909A Apr. 25, 1995.
English Translation of Japanese Patent JP5270076B2 Aug. 21, 2013.
English Translation of CN Publication No. 101279580A dated Oct. 8, 2008.
English Translation of Taiwanese Publication No. 578324B Mar. 1, 2004.
English Abstract of ES Publication No. 2736774 dated Jan. 7, 2020.
Extended European Search Report dated May 23, 2024—EP Patent Application No. 22804154.7.

* cited by examiner

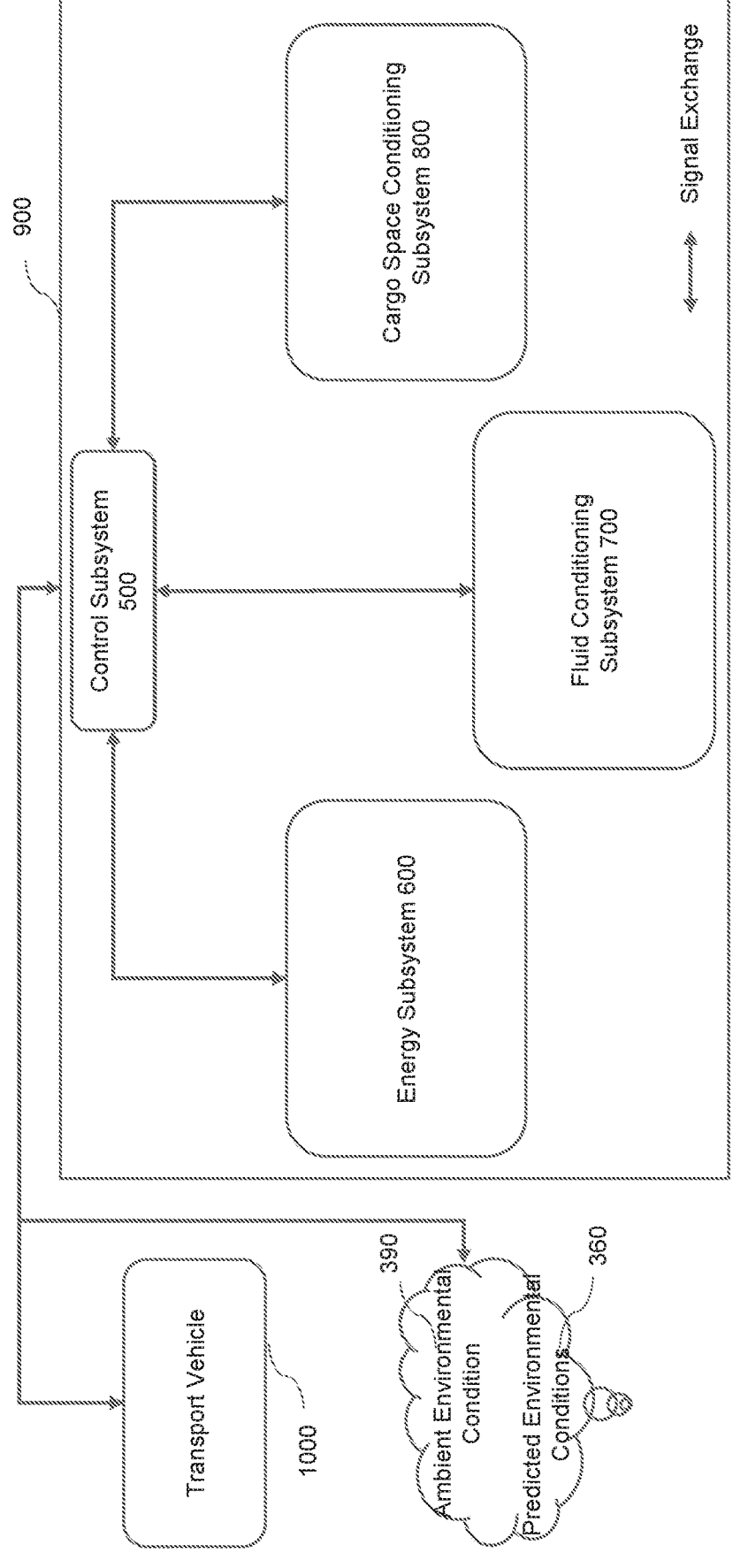
Figure 1: Intelligent Mobile Environmental Control System 900

Figure 2.1: Electric Energy Management
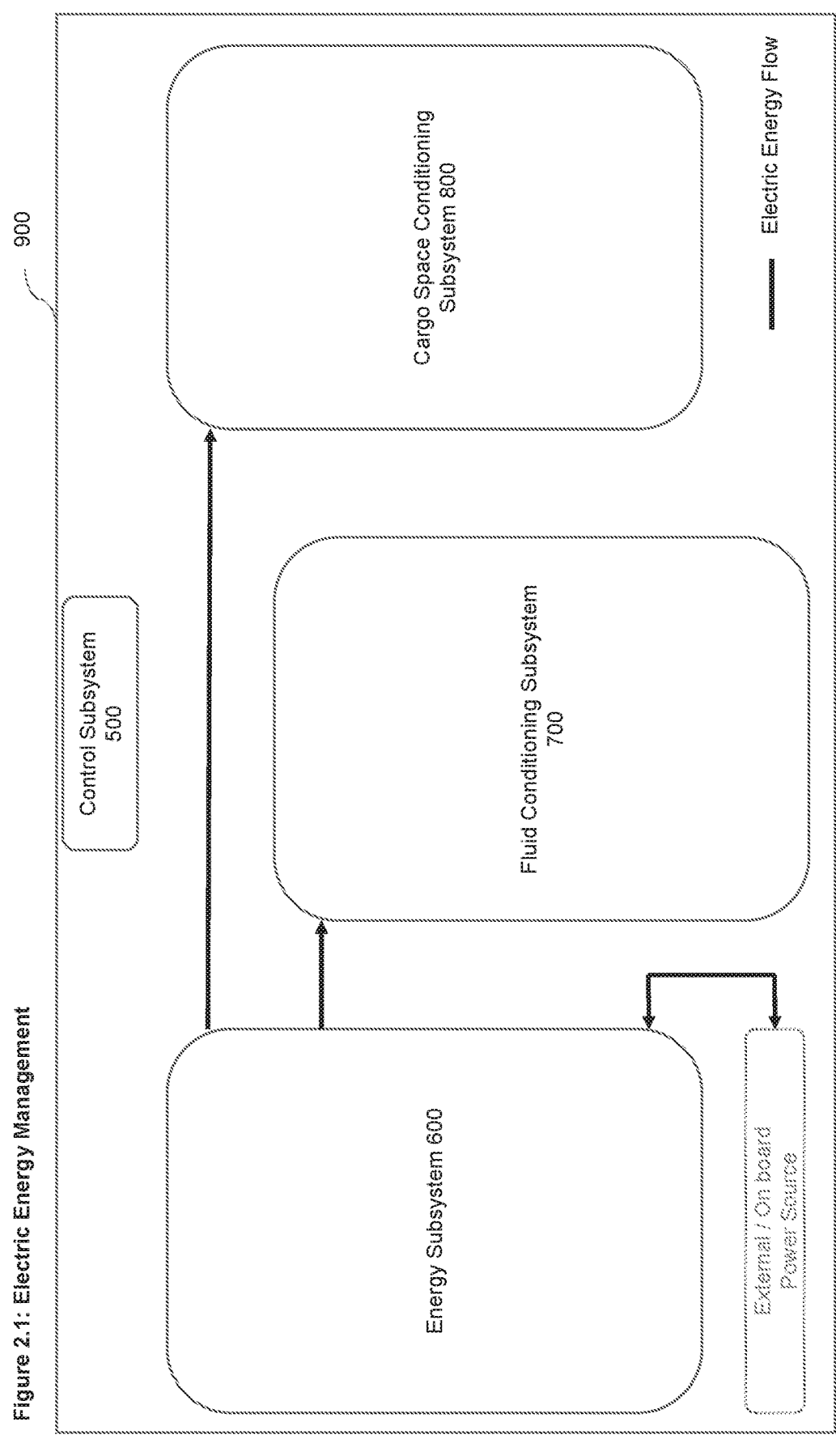

Figure 2.2: Electric Energy Management
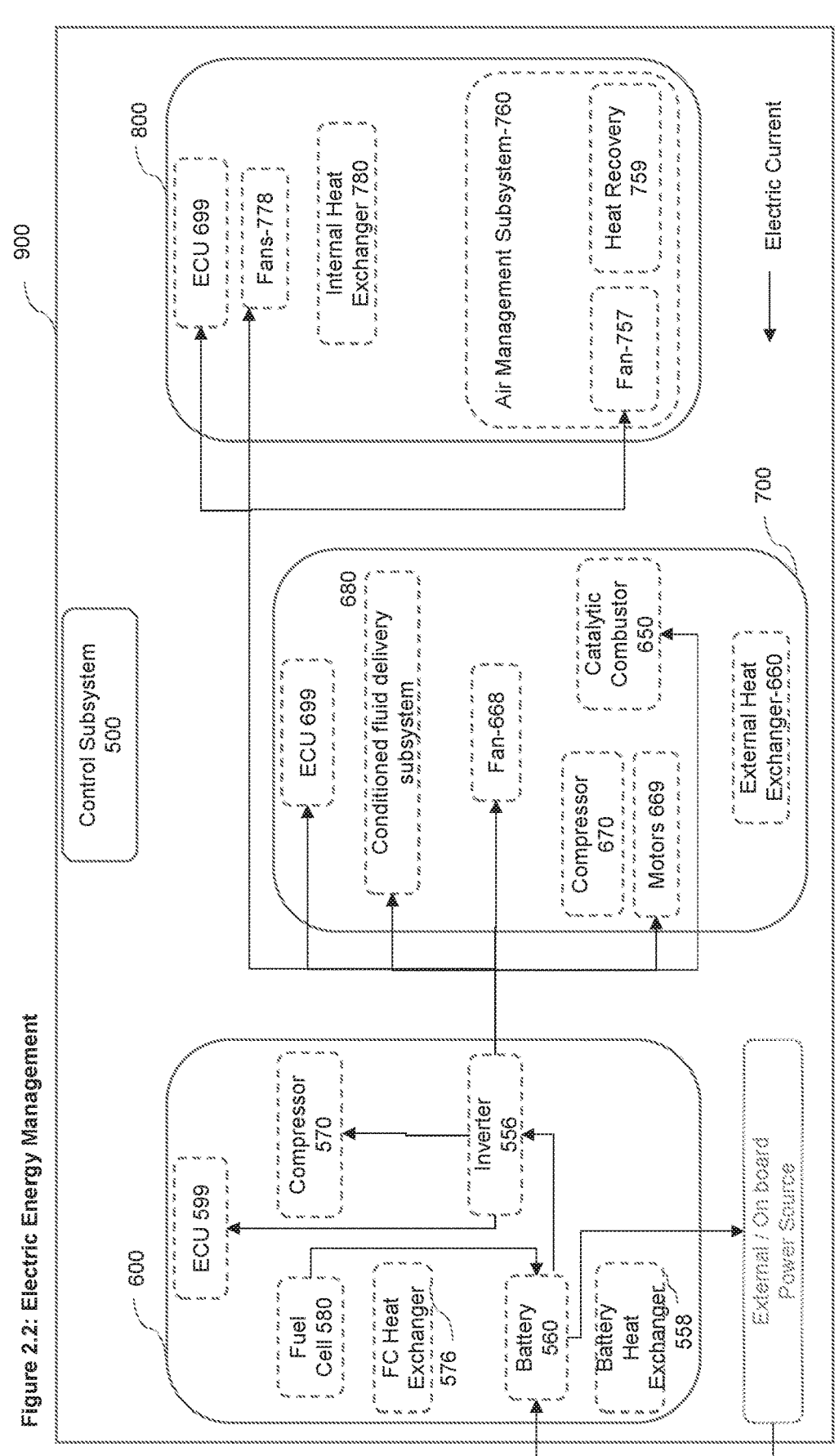

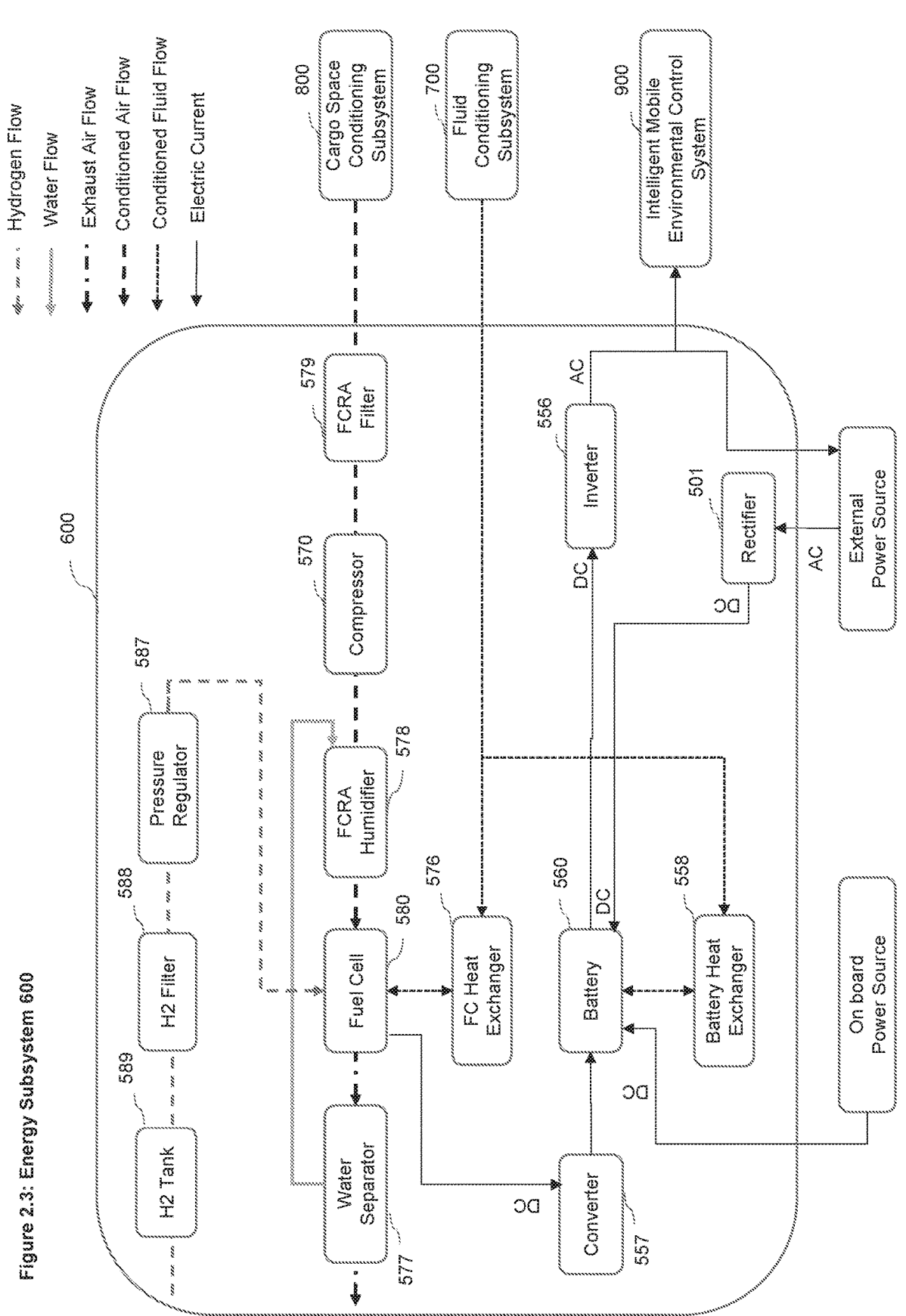
Figure 2.3: Energy Subsystem 600

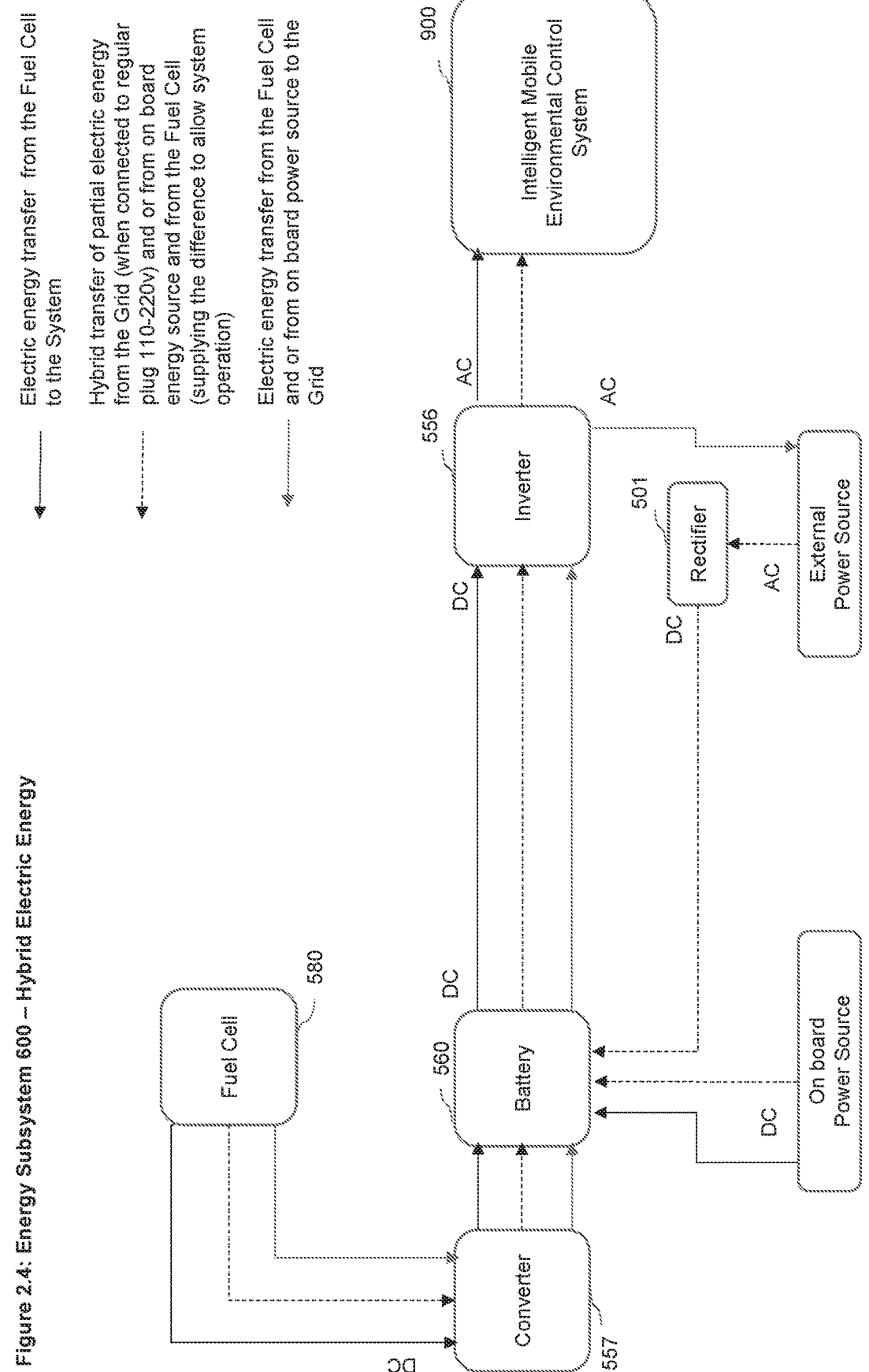

Figure 2.4: Energy Subsystem 600 – Hybrid Electric Energy

Electric energy transfer from the Fuel Cell to the System

Hybrid transfer of partial electric energy from the Grid (when connected to regular plug 110-220v) and or from on board energy source and from the Fuel Cell (supplying the difference to allow system operation)

Electric energy transfer from the Fuel Cell and or from on board power source to the Grid

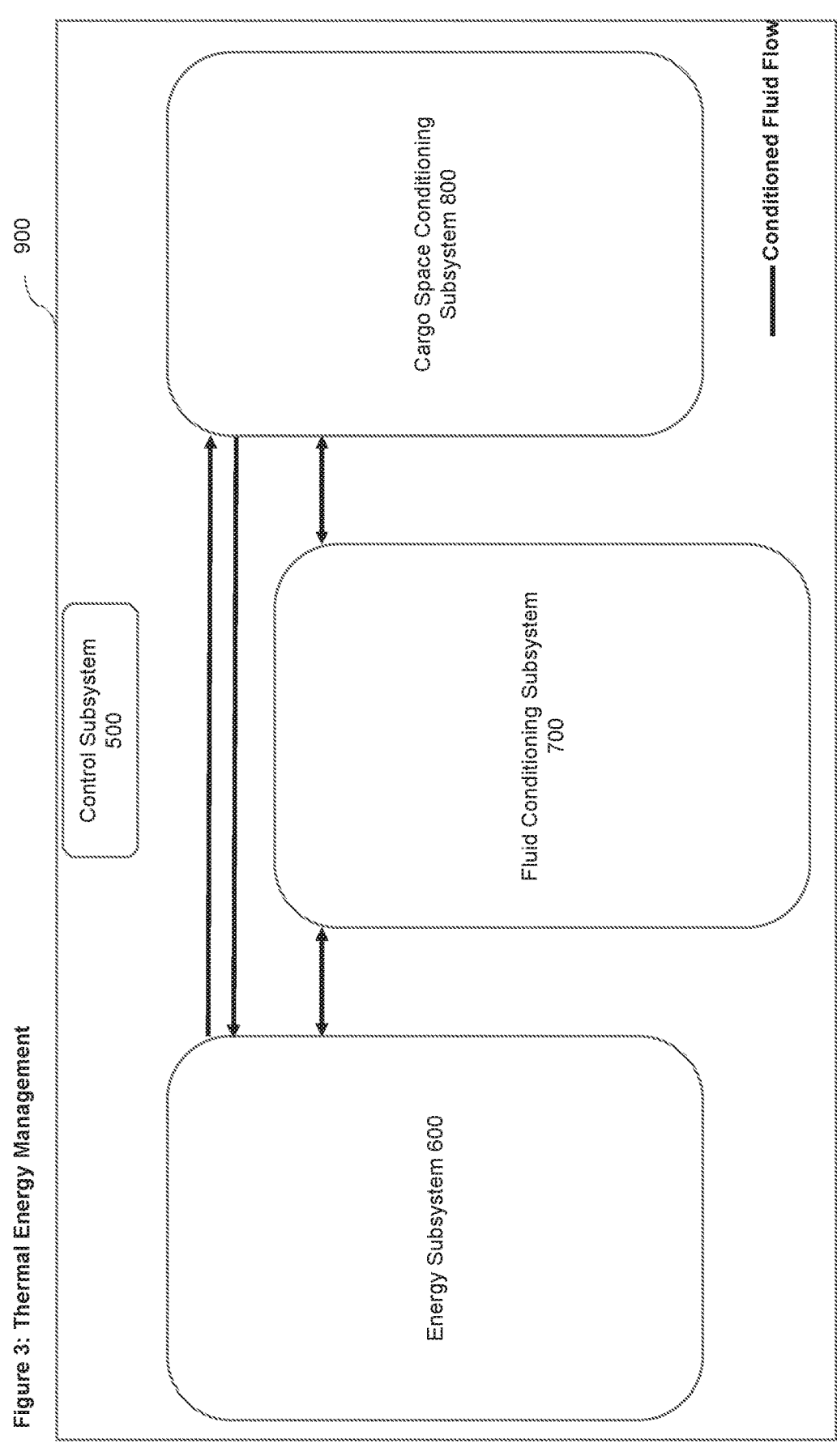
Figure 3: Thermal Energy Management

Figure 3.1: Subsystems Operating Modes
ES=Energy Subsystem

Subsystems Operating Modes
1. Cooling Mode : Steady state operation
2. Heating Mode: Steady state operation
3. Energy Subsystem Warming up Mode: Start up state operation
4. Evaporator Defrosting Mode: Startup state operation or whenever required

| Cargo Space Temperature Setting* | Ambient Conditions | | | |
|---|---|---|---|---|
| | **Extra Cold **<br>(<-4°F, down to -40°F)<br>(-20°C, down to -40°C) | Cold<br>(-4°F to 32°F)<br>(-20°C to 0°C) | Warm<br>(32F to 77F)<br>(0°C to 25°C) | **Hot **<br>(> 77°F, up to +122°F)<br>(> 25°C, up to +50°C) |
| | Subsystem Modes | | | |
| Frozen<br>-13°F to +14°F<br>-25°C to -10°C | ES Warming up Mode (3)<br>Evaporator Defrost. Mode (4)<br>Heating Mode (2) or Cooling Mode (1) | ES Warming up Mode (3)<br>Evaporator Defrost. Mode (4)<br>Heating Mode (2) or Cooling Mode (1) | ES Warming up Mode (3)<br>Evaporator Defrost. Mode (4)<br>Cooling Mode (1) | ES Warming up Mode (3)<br>Evaporator Defrost Mode (4)<br>Cooling Mode (1) |
| Cold<br>+36°F to 46°F<br>+2°C to +8°C | ES Warming up Mode (3)<br>Evaporator Defrost. Mode (4)<br>Heating Mode (2) | ES Warming up Mode (3)<br>Evaporator Defrost. Mode (4)<br>Heating Mode (2) | ES Warming up Mode (3)<br>Evaporator Defrost. Mode (4)<br>Heating Mode (2) or Cooling Mode (1) | ES Warming up Mode (3)<br>Evaporator Defrost Mode (4)<br>Cooling Mode (1) |
| Cool<br>+46°F to 59°F<br>+8°C to +15°C | ES Warming up Mode (3)<br>Evaporator Defrost. Mode (4)<br>Heating Mode (2) | ES Warming up Mode (3)<br>Evaporator Defrost. Mode (4)<br>Heating Mode (2) | ES Warming up Mode (3)<br>Evaporator Defrost. Mode (4)<br>Heating Mode (2) or Cooling Mode (1) | ES Warming up Mode (3)<br>Evaporator Defrost Mode (4)<br>Cooling Mode (1) |

* Based on the US Pharmacopeial convention for Packaging and Storage Requirements
** Ambient condition range of -40°F to +122 °F (-40°C to +50°C) is based on ISO 1496-2 guideline for freight and thermal containers Figure 3.2: Thermal Energy Management- Cooling Mode ―――― Cooling Energy Transfer
·········· Heating Energy Recirculation
– – – – Heating Energy Transfer
―――▶ Ambient Fluid

Conditioned Fluid Flow

800

Control Subsystem 500

ECU 699

Fans-778

Internal Heat Exchanger 780

Air Management Subsystem-760

Fan-757

Heat Recovery 759

900

ECU 699

Conditioned fluid delivery subsystem-680

Fan-668

Catalytic Combustor 650

Compressor 670

Motors 669

External Heat Exchanger-660

700

External/Ambient Environment

600

ECU 599

Compressor 570

Inverter 556

Fuel Cell 580

FC Heat Exchanger
576

Battery 560

Battery Heat Exchanger.
558

External / On board
Power Source

Figure 3:
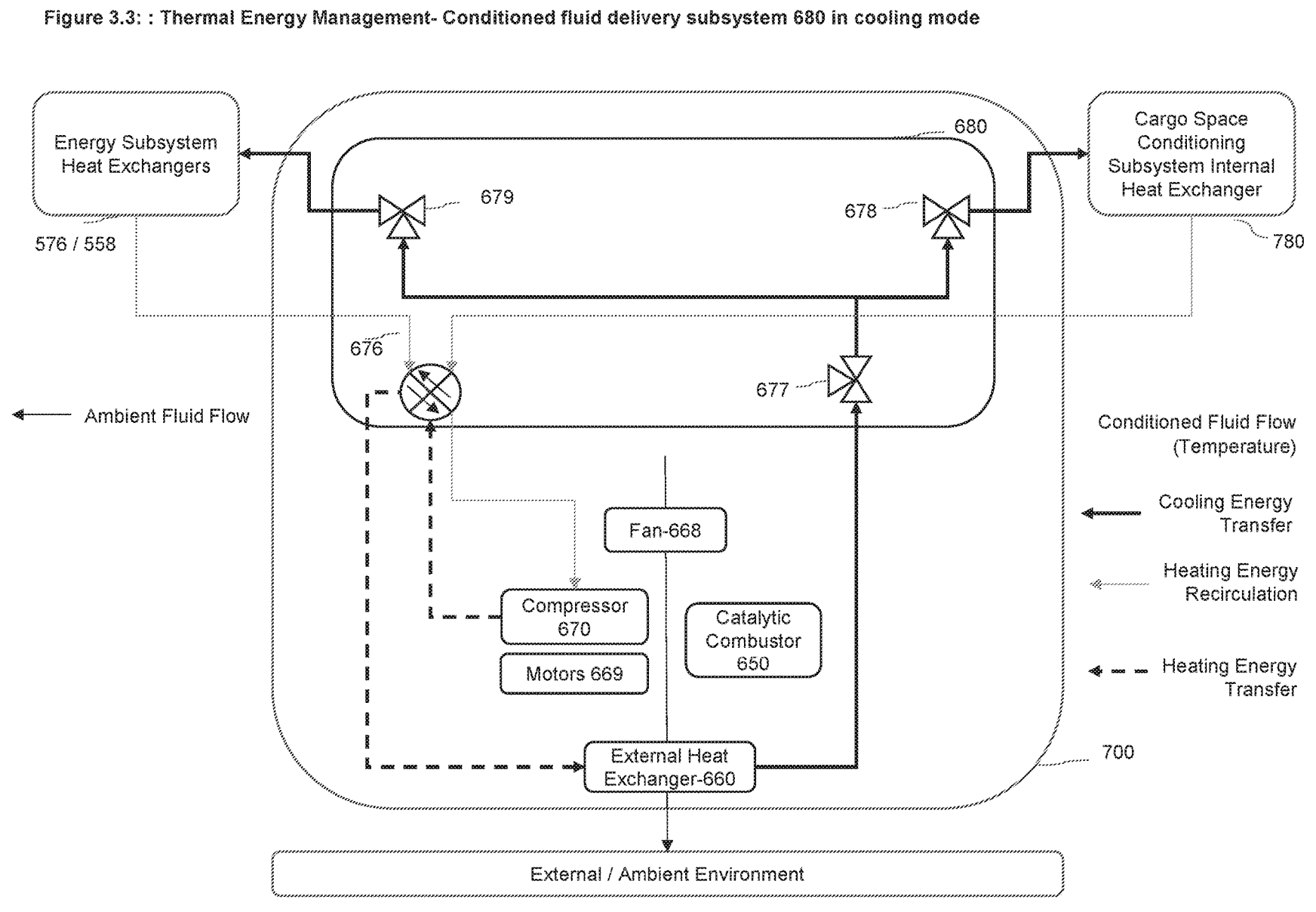

Figure 3.3: : Thermal Energy Management- Conditioned fluid delivery subsystem 680 in cooling mode Cargo Space Conditioning Subsystem Internal Heat Exchanger — 780

Conditioned Fluid Flow (Temperature)

Cooling Energy Transfer

Heating Energy Recirculation

Heating Energy Transfer

700

680

678

677

679

676

Catalytic Combustor 650

Fan-668

Compressor 670

Motors 669

External Heat Exchanger-660

External / Ambient Environment

Energy Subsystem Heat Exchangers

576 / 558

Ambient Fluid Flow

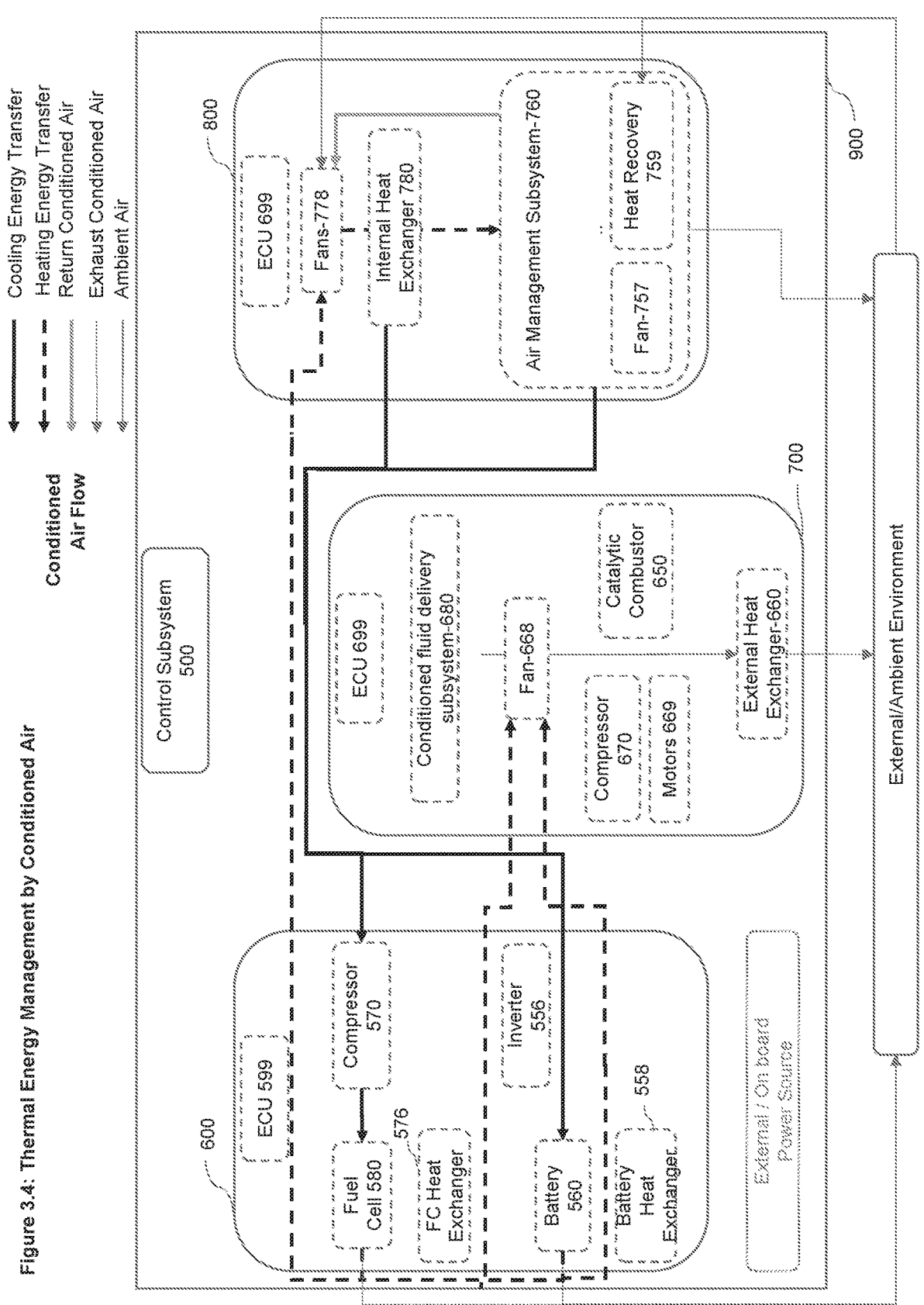
Figure 3.4: Thermal Energy Management by Conditioned Air

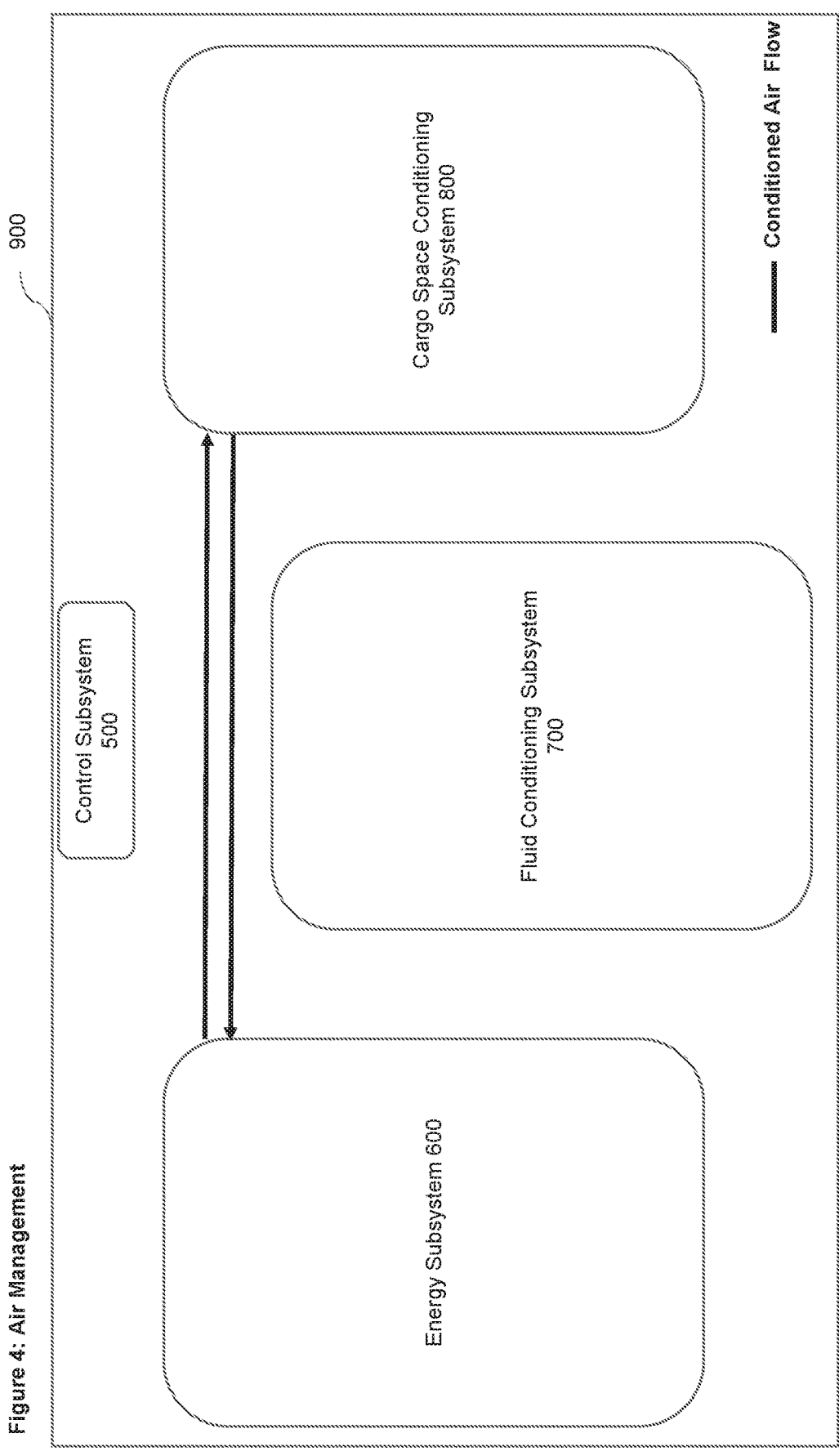
Figure 4: Air Management

Figure 4.1:
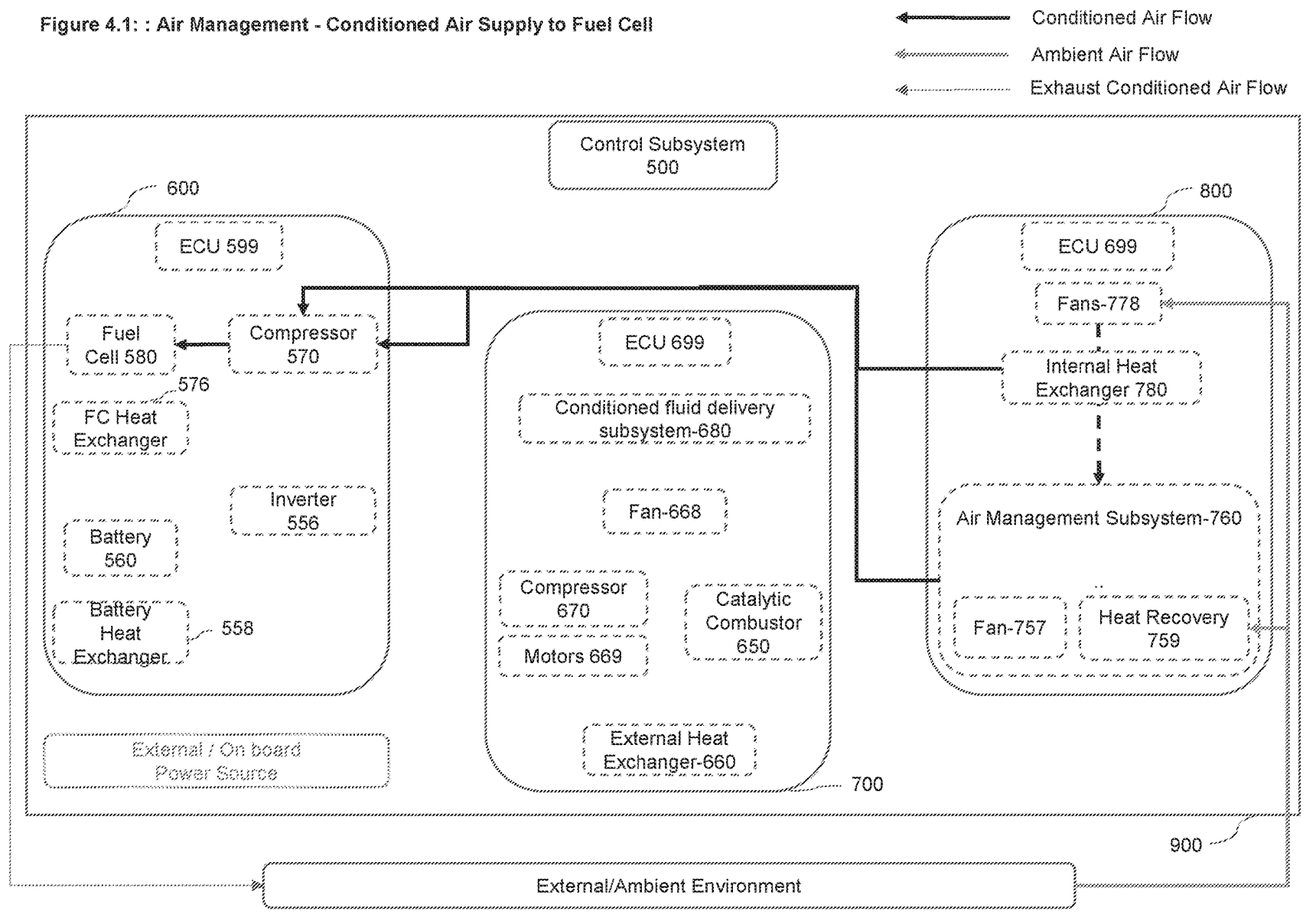

Figure 4.1: : Air Management - Conditioned Air Supply to Fuel Cell

Figure 4:
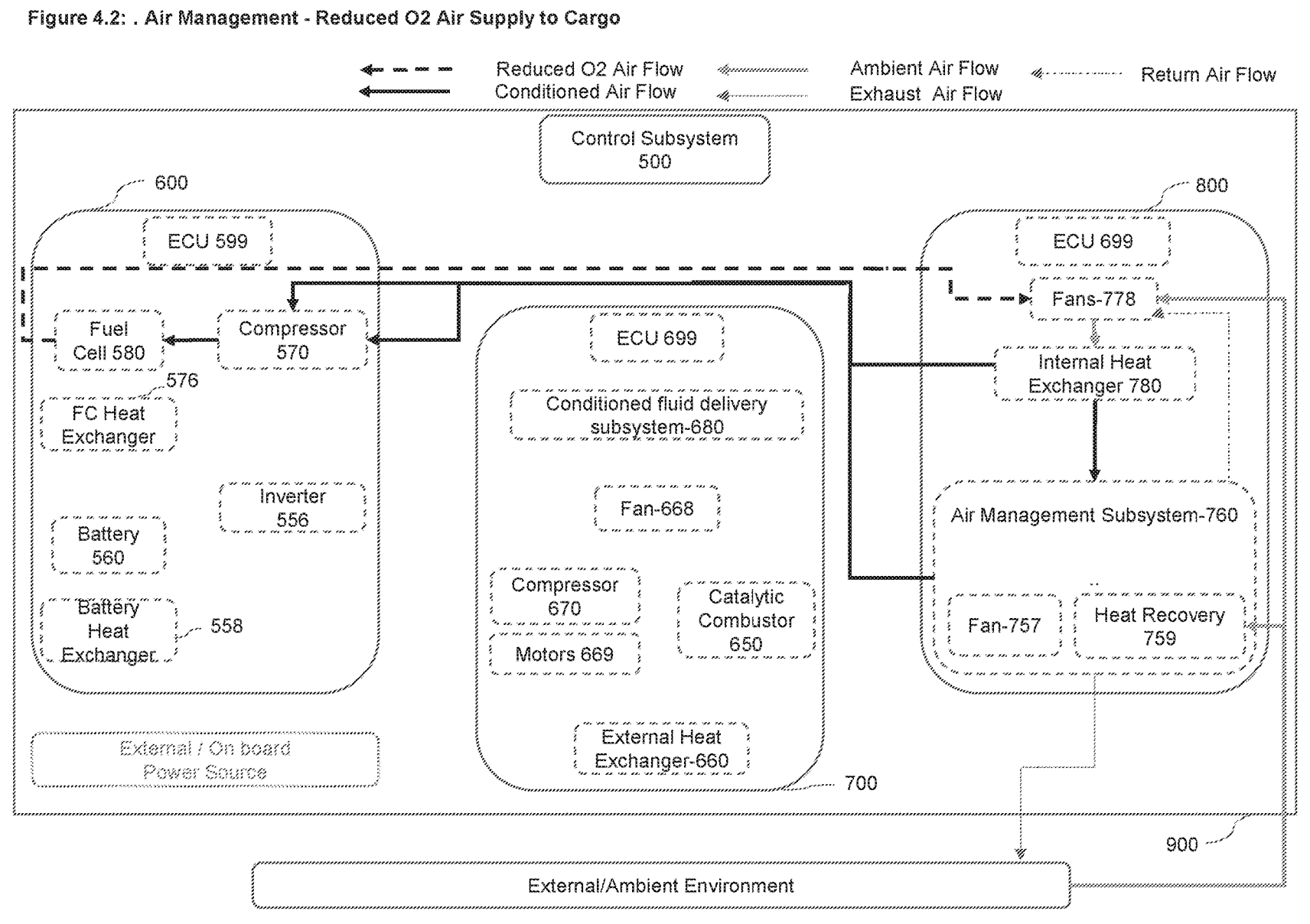

Figure 4.2: . Air Management - Reduced O2 Air Supply to Cargo

Figure 4:
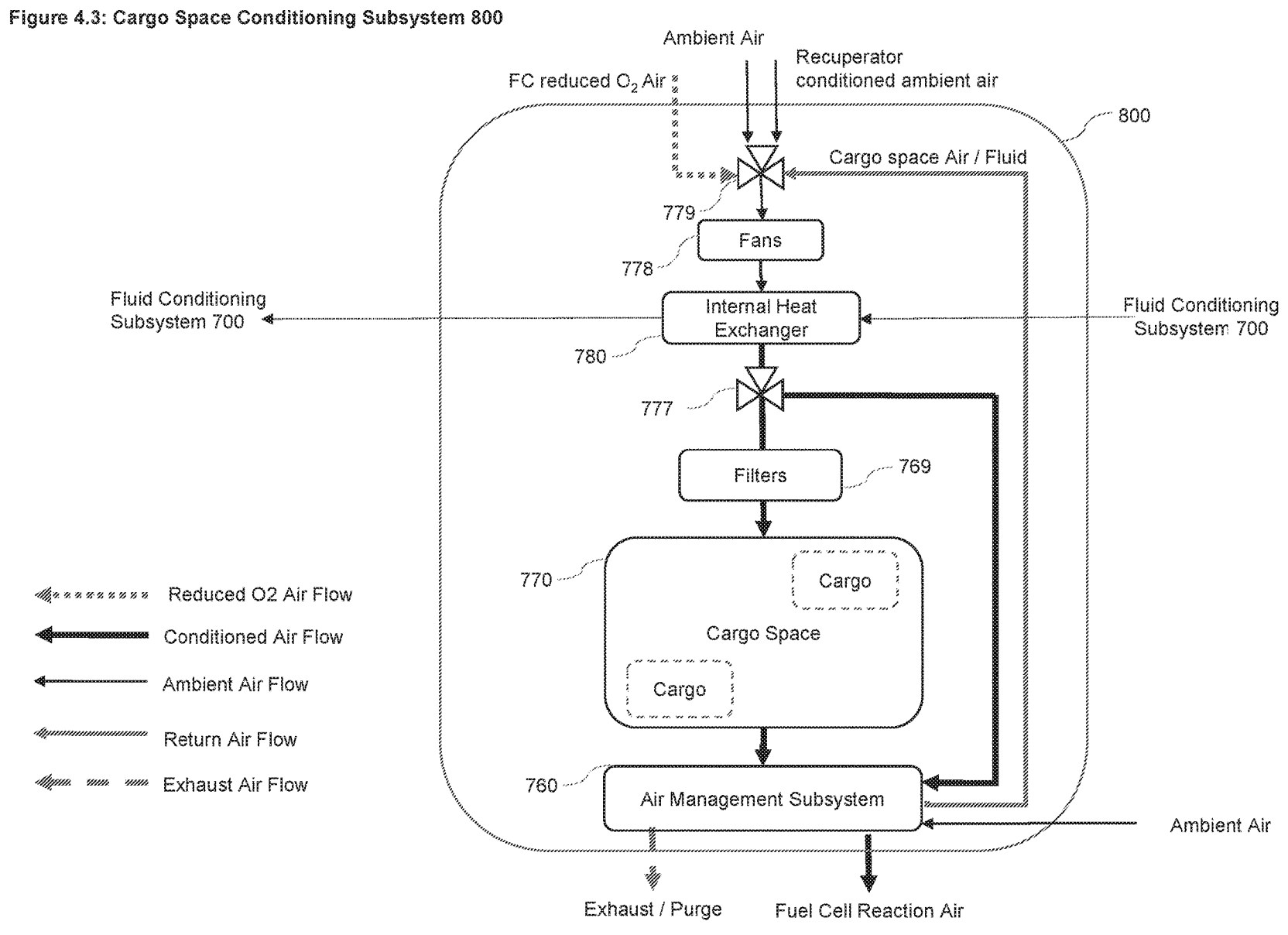

Figure 4.3: Cargo Space Conditioning Subsystem 800

Reduced O2 Air Flow

Conditioned Air Flow

Ambient Air Flow

Return Air Flow

Exhaust Air Flow

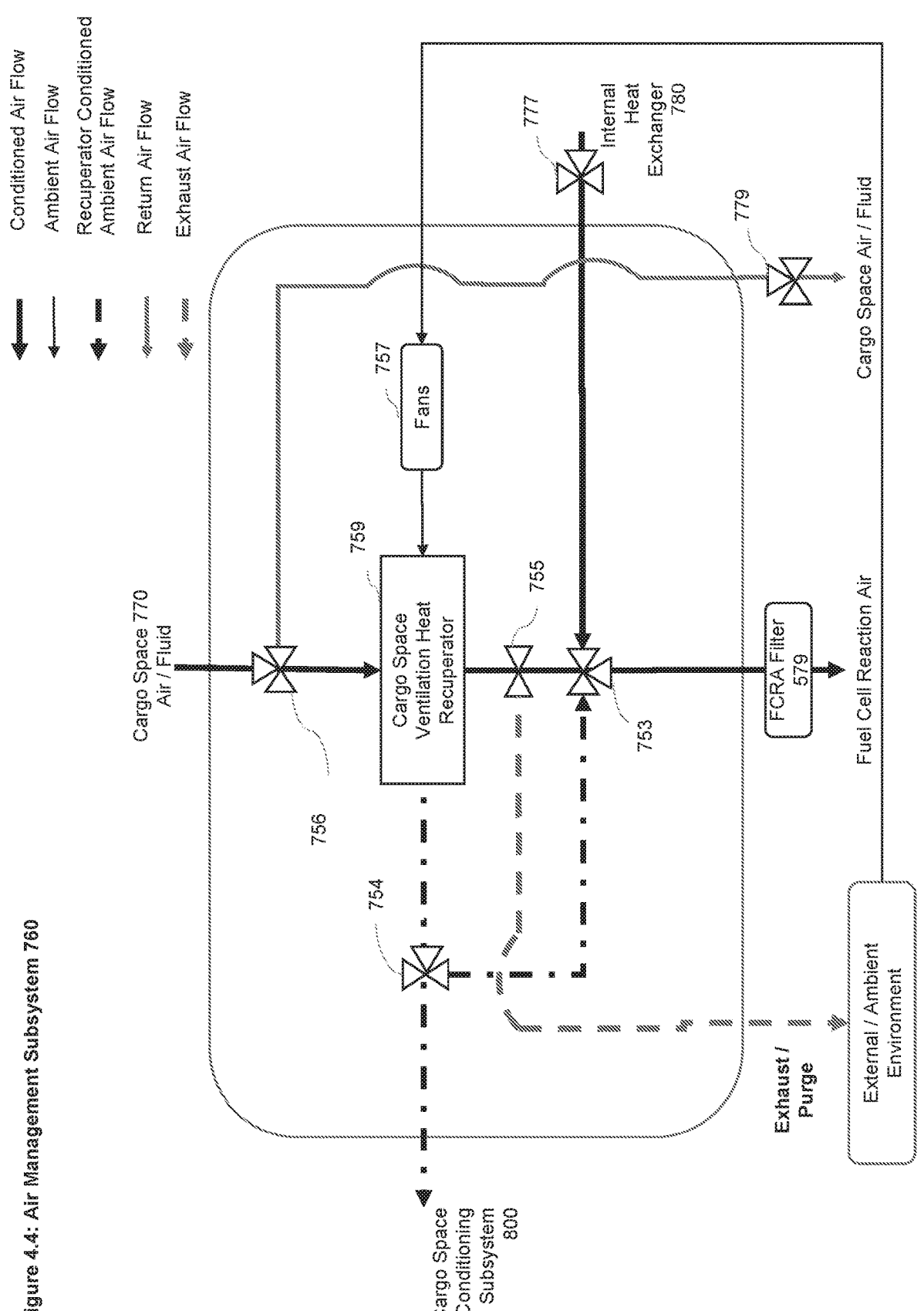
Figure 4.4: Air Management Subsystem 760

Figure 4.5: Air Management Subsystem 760 – Fuel Cell Reaction Air Intake Sources

| Ambient Conditions / Cargo Final Volume Temperature Setting | Extra Cold ** (<-4°F, down to - (<-20°C, down to - | Cold (-4°F to 32°F) (-20°C to 0°C) | Warm (32F to 77F) (0°C to 25°C) | Hot ** (> 77°F, up to +122°F) (> 25°C, up to +50°C) |
|---|---|---|---|---|
| Sources of Fuel Cell Reaction Air *: | | | Example for Ideal Fuel Cell Air Intake Temperature +15°C to 25°C | |
| Frozen -13°F to +14°F -25°C to -10°C | Cargo Space / Heated Ambient / Heat Pump | Cargo Space / Ambient / Heat Pump | Heated Cargo Space / Cooled Ambient / Refrigeration | Heated Cargo Space / Cooled Ambient / Refrigeration |
| Cold +36°F to 46°F +2°C to +8°C | Cargo Space / Heat Pump | Cargo Space / Heat Pump | Heated Cargo Space / Ambient / Heat Pump or Refrigeration | Heated Cargo Space / Refrigeration |
| Cool +46°F to 59°F +8°C to +15°C | Cargo Space / Heat Pump | Cargo Space / Heat Pump | Cargo Space or Heated Cargo Space / Ambient / Heat Pump or Refrigeration | Heated Cargo Space / Refrigeration |

Cargo Space: Air exhausted from the Cargo Space 770
Heated Cargo Space: Heated air from Cargo Space air after Heat Exch. 780 with ambient air via recuperator 759
Ambient: Ambient Air
Heated Ambient: Heated ambient air after heat exchange with Cargo Space air via recuperator 759
Cooled Ambient: Cooled ambient air after heat exchange with Cargo Space air via recuperator 759
Refrigeration: Conditioned air from the cargo space conditioning subsystem exiting the evaporator 780
Heat Pump: Conditioned air from the heat pump subsystem exiting the condenser 780

Figure 5:
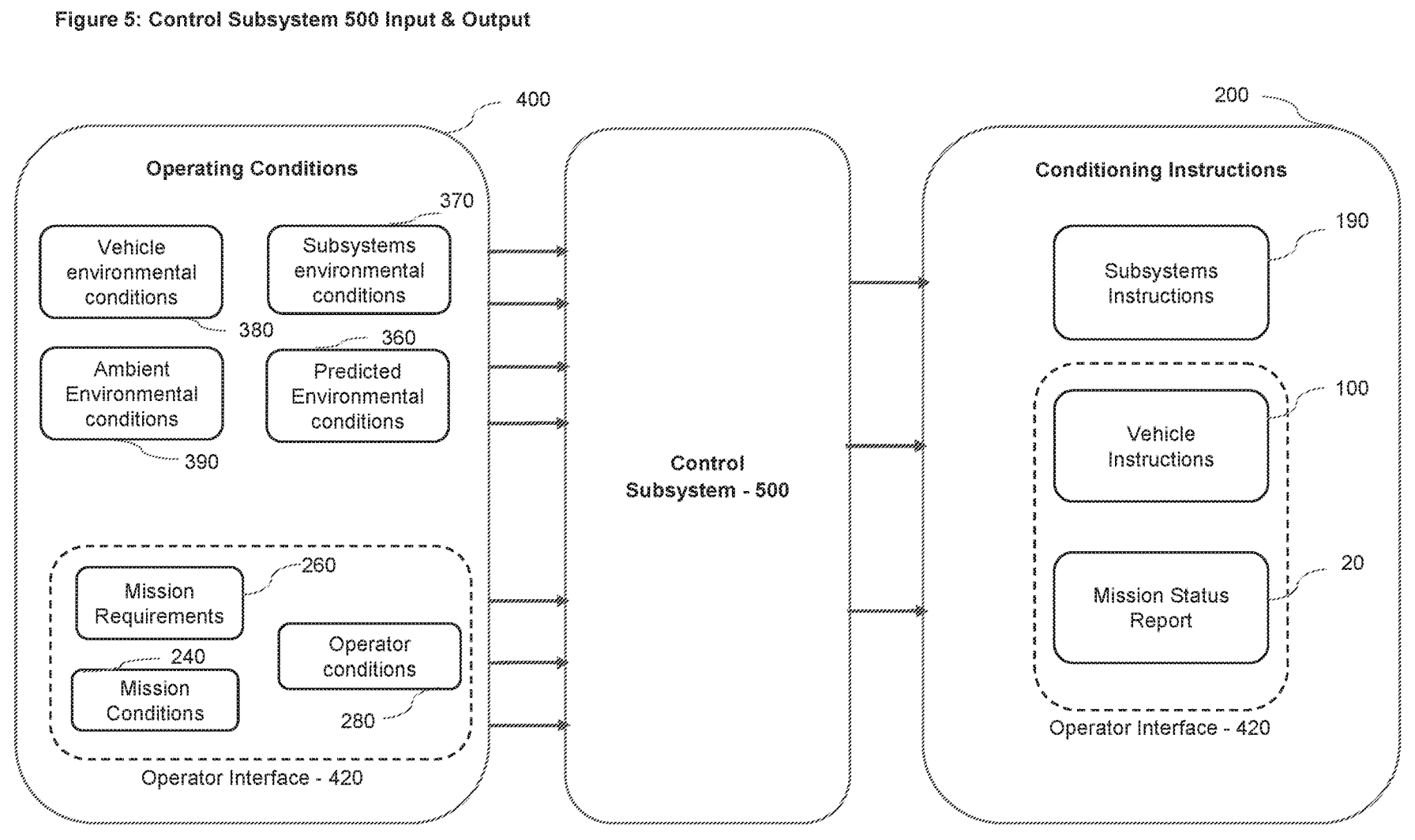

Figure 5: Control Subsystem 500 Input & Output

Conditioning Instructions — 200

- Subsystems Instructions — 190
- Vehicle Instructions — 100
- Mission Status Report — 20

Operator Interface - 420

Control Subsystem - 500

Operating Conditions — 400

- Subsystems environmental conditions — 370
- Predicted Environmental conditions — 360
- Vehicle environmental conditions — 380
- Ambient Environmental conditions — 390
- Operator conditions — 280
- Mission Requirements — 260
- Mission Conditions — 240

Operator Interface - 420

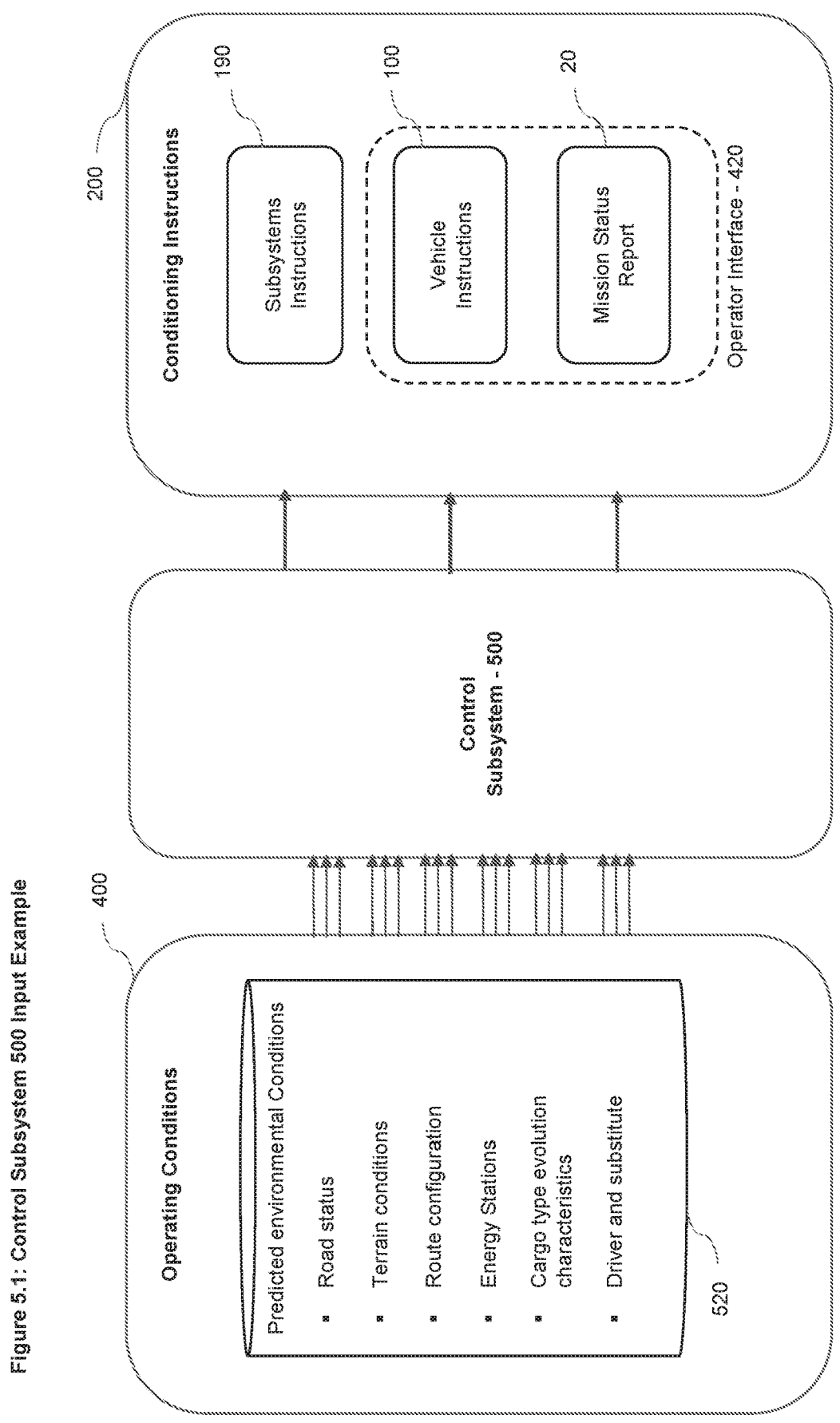
Figure 5.1: Control Subsystem 500 Input Example

Figure 5:
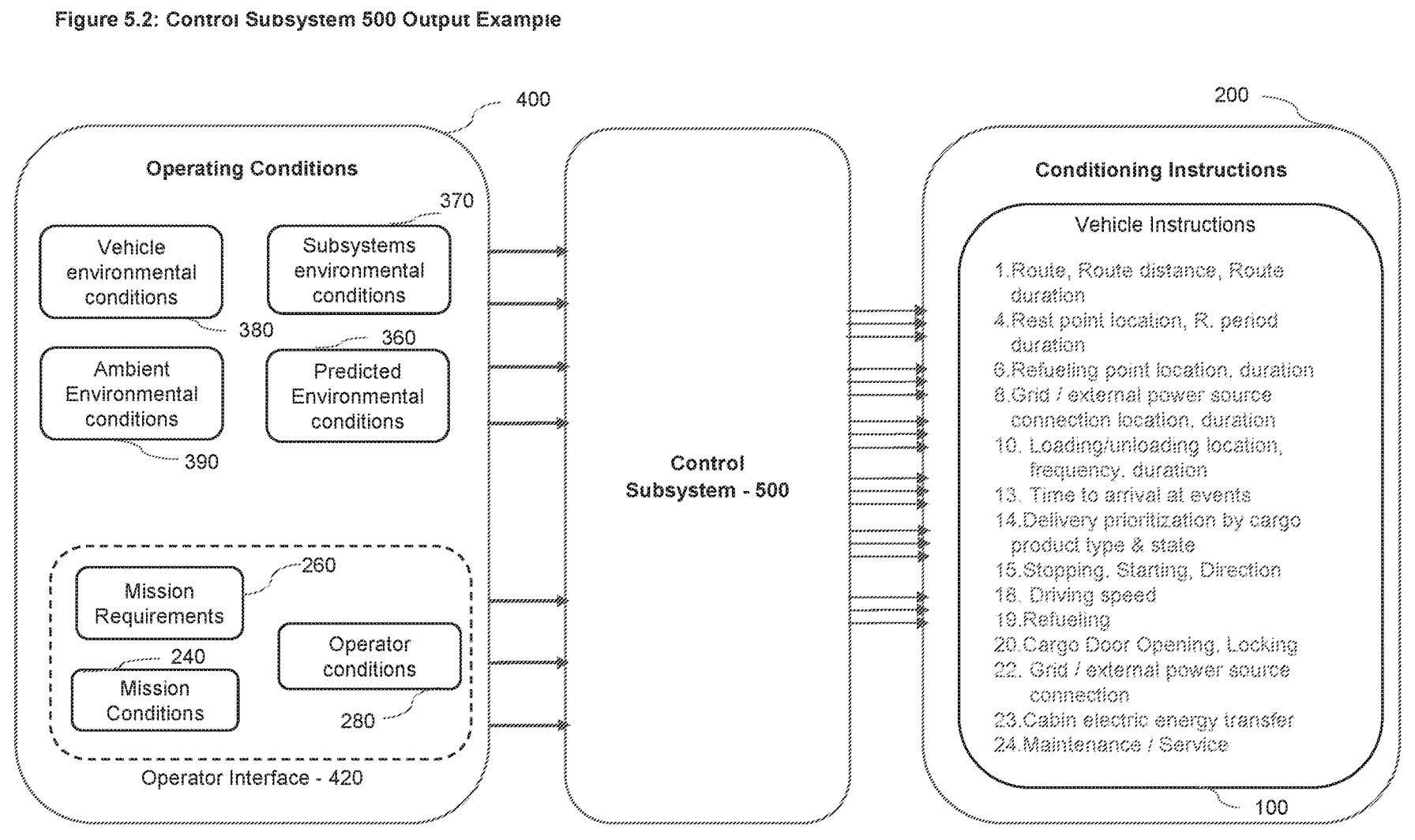

Figure 5.2: Control Subsystem 500 Output Example

Conditioning Instructions — 200

Vehicle Instructions — 100

1. Route, Route distance, Route duration
4. Rest point location, R. period duration
6. Refueling point location, duration
8. Grid / external power source connection location, duration
10. Loading/unloading location, frequency, duration
13. Time to arrival at events
14. Delivery prioritization by cargo product type & state
15. Stopping, Starting, Direction
18. Driving speed
19. Refueling
20. Cargo Door Opening, Locking
22. Grid / external power source connection
23. Cabin electric energy transfer
24. Maintenance / Service

Control Subsystem - 500

Operating Conditions — 400

Subsystems environmental conditions — 370

Predicted Environmental conditions — 360

Vehicle environmental conditions — 380

Ambient Environmental conditions — 390

Operator conditions — 280

Mission Requirements — 260

Mission Conditions — 240

Operator Interface - 420

Figure 5:
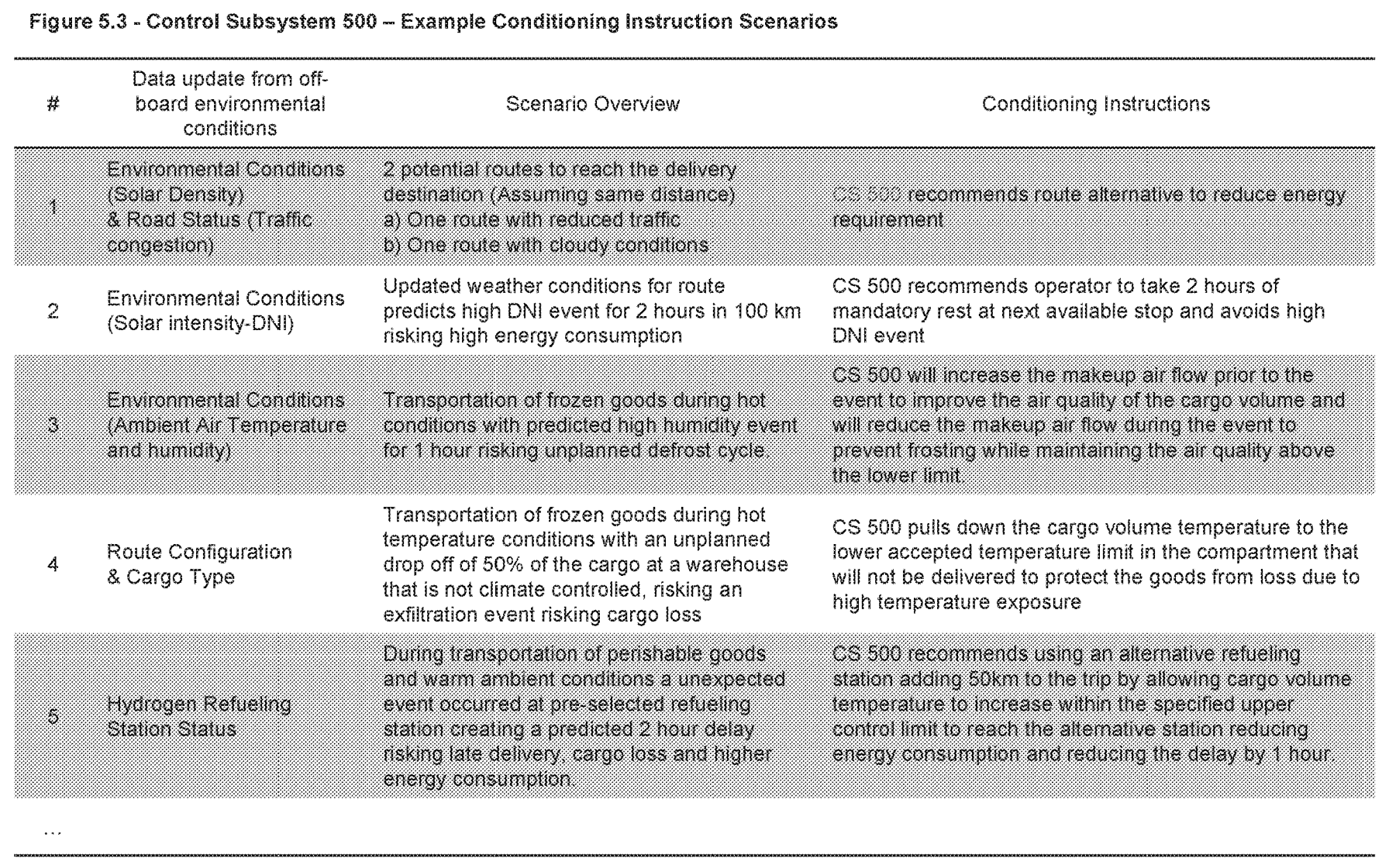

Figure 5.3 - Control Subsystem 500 – Example Conditioning Instruction Scenarios

| # | Data update from off-board environmental conditions | Scenario Overview | Conditioning Instructions |
|---|---|---|---|
| 1 | Environmental Conditions (Solar Density) & Road Status (Traffic congestion) | 2 potential routes to reach the delivery destination (Assuming same distance) a) One route with reduced traffic b) One route with cloudy conditions | ??? recommends route alternative to reduce energy requirement |
| 2 | Environmental Conditions (Solar intensity-DNI) | Updated weather conditions for route predicts high DNI event for 2 hours in 100 km risking high energy consumption | CS 500 recommends operator to take 2 hours of mandatory rest at next available stop and avoids high DNI event |
| 3 | Environmental Conditions (Ambient Air Temperature and humidity) | Transportation of frozen goods during hot conditions with predicted high humidity event for 1 hour risking unplanned defrost cycle | CS 500 will increase the makeup air flow prior to the event to improve the air quality of the cargo volume and will reduce the makeup air flow during the event to prevent frosting while maintaining the air quality above the lower limit |
| 4 | Route Configuration & Cargo Type | Transportation of frozen goods during hot temperature conditions with an unplanned drop off of 50% of the cargo at a warehouse that is not climate controlled, risking an exfiltration event risking cargo loss | CS 500 pulls down the cargo volume temperature to the lower accepted temperature limit in the compartment that will not be delivered to protect the goods from loss due to high temperature exposure |
| 5 | Hydrogen Refueling Station Status | During transportation of perishable goods and warm ambient conditions a unexpected event occurred at pre-selected refueling station creating a predicted 2 hour delay risking late delivery, cargo loss and higher energy consumption | CS 500 recommends using an alternative refueling station adding 50km to the trip by allowing cargo volume temperature to increase within the specified upper control limit to reach the alternative station reducing energy consumption and reducing the delay by 1 hour |
| ... | | | |

Figure 5:
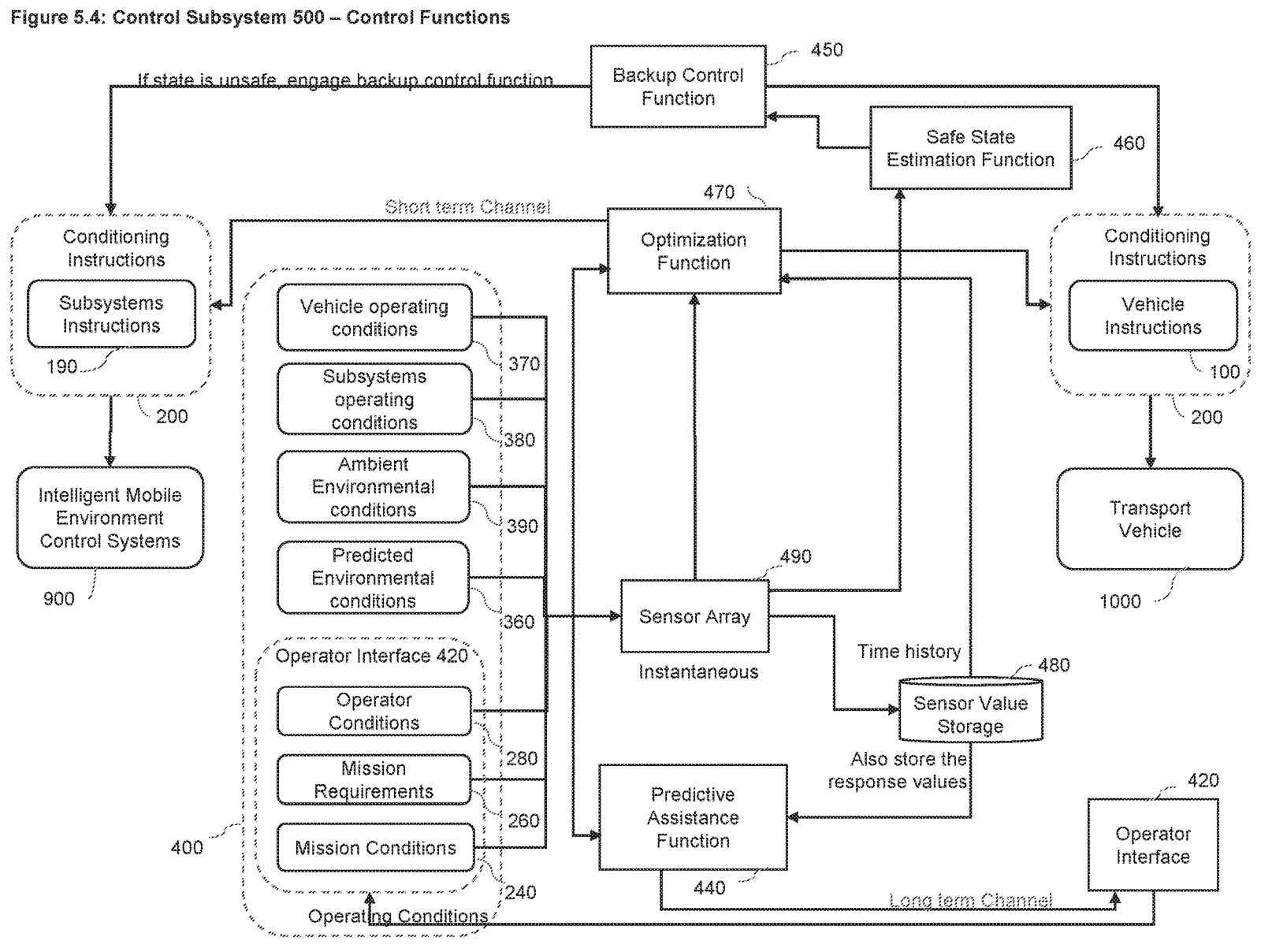

Figure 5.4: Control Subsystem 500 – Control Functions

ZERO CARBON EMISSION AND HIGHLY EFFICIENT INTELLIGENT HYDROGEN-POWERED REFRIGERATION SYSTEM FOR TRANSPORTATION

CROSS-REFERENCE TO RELATED APPLICATIONS

This application is a U.S. nationalization under 35 U.S.C. § 371 of International Application No. PCT/IB2022/054588 filed May 17, 2022, which claims all benefit, including priority, of U.S. Provisional Patent Application Ser. No. 63/189,435, filed 17 May 2021 and entitled "Zero carbon emission and highly efficient intelligent hydrogen-powered refrigeration system for transportation," all the entire contents of which are herein incorporated by reference.

TECHNICAL FIELD

The disclosure relates to refrigeration and environmental control systems for use in transportation, particularly the prediction, the anticipation, the control, the synergies, the interdependencies and the multipurpose uses of the outflows of refrigeration and environmental control subsystems resulting from the integration of hydrogen fuel cell subsystems (FCs) and related components, including vapor-compression refrigeration subsystems (Refri.) and refrigerated cargo final volume subsystems, and optimal control systems (OCS).

BACKGROUND

Significant greenhouse gas (GHG) reductions have to be achieved in order to avoid catastrophic global temperature rise and to meet the CO2 reduction targets that were agreed under the Paris Agreement during COP21. Emission reductions need to come from all verticals, as they are all contributors, and include the industrial, energy production, agriculture, buildings and transportation sectors.

Among the several advantages offered by the various aspects and embodiments of the invention is support of emission reduction objectives for the transportation industry. Based on the Intergovernmental Panel on Climate Change 2014 report, emissions due to transportation represent 14% of the total global emissions which are estimated, for $CO_2$ emission, at 10,000 million metric tons of carbon per year. Carbon Dioxide is not the only GHG component but amounts for the majority of the GHG emission, representing 76% of the total. Within the emissions coming from the transportation sector, 34% are linked to the trucking sector, which is our primary area of development. By extrapolation of previous studies on trucking of refrigerated products, we have estimated that more than 6,000,000 metric tons of $CO_2$ per year, globally, is generated by systems providing refrigeration during the transportation of goods.

Clear goals have been set worldwide to reduce emissions coming from all transport industry actors. To meet these targets, countries have developed roadmaps to achieve carbon neutrality and/or to de-carbonization.

One key solution considered by various countries, in combination with the production increase of renewable energies, is to augment the production and use of green hydrogen, as this environmentally-friendly energy can be stored.

However, the adoption of this storable green source of energy has been slow due to two main factors. The first factor is the cost of this energy in comparison to other energies. Large progress and technical advancements have been achieved in this regard in recent years, now allowing for more competitive pricing of this energy. The second factor is related to the status of the infrastructure allowing road access to this energy. This is particularly critical for the mobility sector and progresses still need to be made.

Another challenge to be considered is the global population growth. Not only has research demonstrated that the current levels of CO2 are directly related to the population size but also that this increase is generating a growing demand in food products, requiring additional food production and food distribution.

Combined with the fact that urbanization continues to rapidly expand, the distribution demand will further increase, requiring refrigerated or other environmentally-controlled transportation from regions where goods are produced to the cities and mega-cities where these goods need to be delivered. Depending on the type of products and of the duration prior to consuming them, transportation is required to accommodate safe shipment for various categories of, for example, perishable and frozen goods. For example, medicine and pharmaceutical products need to be delivered from cities to cities, countries to countries, with similar safe transportation requirements, which are primarily based on air quality and temperature management and control of the cargo.

Lastly, as we are facing global pandemics, concern for the safety and quality of goods during shipment will further increase, augmenting the requirements for cold transportation as a critical link in the cold chain, in particular in the developing nations where safety standards will be harmonized with developed nations and regions.

As of today, more than 90% of transportation refrigeration unit (TRU) solutions for long haul and large trailers are based on diesel technology to power the refrigerated modules. Other solutions consider battery electric for smaller transportation cargos or diesel hybrid, combining diesel and battery electric systems.

Diesel systems have been somewhat effective up to now to support the distribution of refrigerated goods but among other problems they are contributing to carbon emissions and to other types of pollution including NOx, particulates and noise, with growing global desire to reduce these types of pollution.

Battery electric solutions can be an effective way to reduce noise pollution and CO2 emissions, assuming that the electricity is sourced from renewable energy, but among other shortcoming are limited in scope to smaller transportation modules, as battery size and weight increase exponentially for larger module applications, voiding the carbon reduction benefit due to the demand of additional power and consumption from the truck/tractor to carry this additional load. Another key limitation is the filling time needed to recharge electric batteries to 100% capacity, requiring hours versus minutes for current diesel solutions. Battery electric solutions have the added disadvantage of having to transport the entire mass of the battery for the trip where fuel based systems reduce fuel payload as energy is consumed.

SUMMARY OF THE INVENTION

This summary is provided to introduce a selection of representative concepts in a simplified form that are further described below in the detailed description. This summary is not intended to be limited to any "key features" or "essential features" of the claimed subject matter, nor is it intended to be used in any way that would limit the scope of the claimed subject matter.

In various aspects and embodiments the invention provides Transportation Refrigeration Unit (TRU) systems, which we currently refer to as Hydro-Cool™, comprising various components, including interdependent subsystems, and which provide highly efficient solutions for the refrigeration or other environmental control of cargo volumes during transportation. Such solutions can offer some or all of low to no CO2 emissions, NOx and particulate pollution reduction, operation at reduced noise levels, fast charging, and reduced weight and increased life expectancy compared to state of the art existing units. A further advantage of the concept compared to Diesel powered TRUs is the ability of the concept to be connected to and operate using available grid sourced or locally stored electric energy when stationary in an efficient manner as the refrigeration system is electrically operated. Diesel hybrid systems that are capable of being operated when stationary using available grid sourced or locally stored electric energy require costly and mass intensive complexity and redundancy to allow operation with both Diesel or electric power.

High levels of efficiency, corresponding to fuel consumption reduction and system durability increase, can be realized through the anticipation and prediction of cooling or heating capacity requirements from intelligent on board control systems and components, and by the multipurpose uses and synergy of the outflows of each subsystem and their interdependence. In some illustrative embodiments we present how the refrigerated subsystem can transfer cooling and heating energy to the fuel cell of the hydrogen subsystem, how the fuel cell can generate electricity powering the overall system, how the fuel cell can generate reduced oxygen air that is used in the cargo volume of the refrigeration subsystem, how the refrigerated cargo volume can deliver reaction air for the fuel cell of the hydrogen subsystem and how the optimal control system can anticipate, predict, and autonomously reconfigure the overall system while submitting recommendations to any human and/or automated or semi-automated system operators including for route guidance and rest and refueling stop scheduling Thus, for example, in various aspects and embodiments the invention provides TRU solutions to support CO2 emission reduction in a plurality of ways: as one example, by allowing transportation refrigeration units to operate without emitting any CO2; as a second, by enhancing the usage of hydrogen including green hydrogen, consequently increasing the rationale for hydrogen refueling infrastructure and its benefit and its use to the broader mobility sector, third, by enabling use of renewable electric energy for operating TRUs through providing connection to the grid when renewable energy is available or locally stored renewable electrical energy or onboard renewable electrical energy generation.

Additionally, in various aspects and embodiments the invention provides intelligent solutions for predicting and defining optimal solutions and configurations for energy efficiency, able to operate with low noise level, able to fast-charge, with the option of no weight penalty compared to current state-of-the-art systems, with a long life expectancy and complying with the requirements for quality and safety of the food and pharmaceutical distribution sectors.

Thus for example the disclosure provides intelligent solutions for predicting and defining optimal TRU mission and TRU configurations for energy efficiency or pollution reduction in accordance with various aspects and embodiments of the invention, in addition to being applied to the Hydrogen powered TRU described in the embodiment, can be applied to conventional and future TRU configuration including Diesel, Diesel Hybrid, or battery powered TRUs addressing the need to improve the performance of the existing and future TRU fleet.

BRIEF DESCRIPTION OF THE DRAWINGS

The invention is illustrated in the figures of the accompanying drawings, which are meant to be exemplary and not limiting, and in which like references are intended to refer to like or corresponding parts.

FIG. 1 is a schematic block diagram showing communicational relationships between components of an intelligent mobile environmental control system in accordance with aspects and embodiments of the invention.

FIGS. 2.1, 2.2, 2.3, and 2.4 are schematic block diagrams showing energy transfer relationships between components of an intelligent mobile environmental control system in accordance with the same and other aspects and embodiments of the invention.

FIG. 3 is a schematic block diagram showing thermal transfer relationships between components of an intelligent mobile environmental control system in accordance with the same and other aspects and embodiments of the invention.

FIG. 3.1 is a schematic tabulation showing functional relationships between system operational conditions and ambient environmental conditions in accordance with the same and other aspects and embodiments of the invention.

FIGS. 3.2, 3.3, and 3.4 are schematic block diagrams showing thermal transfer relationships between components of an intelligent mobile environmental control system in accordance with the same and other aspects and embodiments of the invention.

FIGS. 4, 4.1, 4.2, 4.3, and 4.4 are schematic block diagrams showing fluid management relationships between components of an intelligent mobile environmental control system in accordance with the same and other aspects and embodiments of the invention.

FIG. 4.5 is a schematic tabulation showing functional relationships between system operational conditions and ambient environmental conditions in accordance with the same and other aspects and embodiments of the invention.

FIGS. 5, 5.1, and 5.2 are a schematic block diagrams showing control relationships between components of an intelligent mobile environmental control system in accordance with the same and other aspects and embodiments of the invention.

FIG. 5.3 is a schematic tabulation showing example relationships between system operating instructions and environmental conditions in accordance with the same and other aspects and embodiments of the invention.

FIG. 5.4 is a schematic block diagram showing control relationships between components of an intelligent mobile environmental control system in accordance with the same and other aspects and embodiments of the invention.

DETAILED DESCRIPTION OF THE PREFERRED EMBODIMENTS

In the following description, specific details are set forth to provide a thorough understanding of examples of various aspects and embodiments of the invention. However, one skilled in the relevant arts will understand that the invention may be practiced in accordance with variations of such details, and in some aspects and embodiments, without them. To that end preferred embodiments of methods, systems, and apparatus according to the invention are described through reference to the drawings.

As shown for example FIG. 1, in various aspects and embodiments, an intelligent mobile environmental control system 900, sometimes referred to as an innovative Transportation Refrigeration Unit (TRU), comprises various subsystems and components, and combinations of subsystems and components, which can be integrated and interdependent, including for example one or more energy subsystem(s) 600, fluid conditioning subsystem(s) 700, cargo space conditioning subsystem(s) 800, and or control subsystem(s) 500. Novel methods are presented of electric energy management, thermal energy management, air management and can be achieved by an intelligent mobile environmental control system 900 providing synergy and control between subsystems. Additionally an intelligent mobile environmental control system 900 can provide novel methods to optimize the system performance that can include but not limited to predictive methods.

In the embodiment shown in FIG. 1, the cargo space block 800 represents the volume as a single volume, but the same method and innovation can apply to a cargo final volume with several compartments, having distinct temperature requirements serviced by common or by fully or semi-independent systems and components. A cargo space represents a refrigerated cargo final volume or any conditioned volume able to store and condition a cargo. A cargo space and its cargo and or its dunnage can be considered as a thermal storage capacity.

In implementing various aspects and embodiments of the disclosure, and in particular in moving flows and fluids between and/or within various components, valves and other flow routing or control devices can be used to direct and or combine a fluid or multiple fluids with or without electrical or mechanical or other actuation means and with or without sensing capability. Switches can be used to direct and or combine electrical current(s) with or without electrical or mechanical or other actuation means and with or without sensing capability.

Fluids and fluid flows represented in the figures can include many types and combinations of types of conditioning fluids, used for various purposes. For example, in an embodiment such as that shown in FIG. 1, a first conditioning fluid that can be a refrigerant fluid, a second conditioning fluid than can be an internal intake fluid, a third conditioning fluid that can be at least one fluid of a cooling subsystem of an energy subsystem and or a fourth conditioning fluid that can be external intake fluid.

In various aspects, the invention provides novel methods of electric energy management between an energy subsystem 600, a fluid conditioning subsystem 700, a cargo space conditioning subsystem 800 and a control subsystem 500 controlled by a control subsystem 500 of an intelligent mobile environmental control system 900. This electric energy management can comprise methods of managing electric energy between an intelligent mobile environmental control system 900 and at least one other on board energy source of a transport vehicle and or at least one off-board energy source.

Processor 206 can comprise any one or more data processor(s), computer(s), and/or other system(s) or device(s), and necessary or desirable input/output, communications, control, operating system, and other devices, including software, that are suitable for accomplishing the purposes described herein. For example, a general-purpose data processor provided on one or more circuit boards, as provided by Intel, IBM, Compaq, and a number of other producers, using a UNIX, Apple, or Microsoft general-purpose operating system and suitable navigation application software programs, will suffice. A large number of suitable devices, including many adapted for long-term exposure to corrosive environments, are now available and will doubtless hereafter be conceived and developed. The selection of suitable components to serve as and/or with processors 204, including support and control components and software, in accordance with the invention, will not present difficulty to those of ordinary skill in the art once they have been made familiar with this disclosure.

As illustrated in FIG. 2, an energy subsystem 600 can generate electric energy and provide this electric energy to a fluid conditioning subsystem 700 and or to a cargo space conditioning subsystem 800 and or to all their assemblies and components requiring electric energy. Additionally an energy subsystem 600 can provide electric energy to on board and or external demands, and or can receive electric energy from on board and or external energy sources.

When a fuel cell 580 and or a battery 560 of an energy subsystem 600 are operating, they can generate electricity by chemical reaction. A battery 560 can comprise a control unit that can be a control switch or an Electronic Control Unit (ECU) or a Battery Management System (BMS).

In the case of a fuel cell 580, chemical reaction is the reaction of two consumables, for example air and hydrogen. To achieve this reaction and generation of electric energy, as illustrated in FIG. 2.1, a fuel cell 580 can receive hydrogen from an on-board hydrogen tank(s) 589 that can be filled up from external sources via a tank charging port, with compressed hydrogen (typically but not limited to 700 bar) that can be released to the system as per the needed quantity controlled by at least one valve, a fuel cell ECU 599 (Electronic Control Unit(s)) and or a control subsystem 500. Hydrogen can also be stored cryogenically in a liquid phase or in a metal hydride or in any other form of storage. Hydrogen tank(s) 589 and tank charging port(s) can comprise sensors that can measure hydrogen pressure and temperature in the tank and measure for example the hydrogen intake flow, pressure, temperature, purity, and or other conditions. As the pressure can be relatively high in hydrogen tank(s), pressure gradients between the pressure in the tank and the pressure in an energy subsystem 600 can allow for the compressed hydrogen to flow for example to an energy subsystem 600 and to at least one hydrogen filter 588 with its sensor that can monitor the purity and pressure of the hydrogen and can help eliminate other potential gases that may have been mixed with the hydrogen during the production process (removing contaminants such as but not limited to CO2, CO, N2 . . . critical to mitigate damage to PEM fuel cells), storage, transportation, etc. The compressed hydrogen can then be channeled to a pressure regulator 587 where sensor(s) can measure hydrogen intake and output pressure, to reduce the hydrogen pressure from the tank(s) pressure to pressures required by or otherwise compatible with the fuel cell 580, for example at around 2-3 bar (can for example be higher with some types of fuel cells). It can then be delivered to a fuel cell 580, as the first consumable for reaction, through at least one valve that can be in communication with a fuel cell(s) ECU 599 and or a control subsystem 500 for overall system management. The type of the fuel cell 580 shown in embodiment can be a PEM type (Proton Exchange Membrane) but the invention can apply to the other types of fuel cells such as Solid Oxide SOFC and or other reactants.

Other reaction consumable(s) required by a fuel cell 580 to operate can include air that reacts with the hydrogen. For efficient operation of a fuel cell 580, such air, which can be referred to as fuel cell reaction air, generally contains oxygen, and is preferred to be stable and conditioned, pure, cool and humid air. This embodiment later described methods to optimize the state of fuel cell reaction air.

As illustrated in FIGS. 2.1 to 2.2, in such embodiments, when an energy subsystem comprises a fuel cell 580, the electrical current from a fuel cell 580 can pass through a converter 557 (DC to DC) and through a battery 560 and, can be controlled by a control subsystem 500 to power all systems requiring electrical energy via an inverter 556 that transforms DC to AC.

One purpose of a converter 557 can be to help ensure the health of a fuel cell 580 by preventing excessive current draw. In this configuration, a battery 560's primary function can include provision of electrical energy to a fuel cell 580 heating system during its startup sequence, where for example this heating system acts as a fluid conditioning subsystem 700 in reverse cycle (heat pump), further enhancing the integration and synergy of an energy and fluid conditioning subsystems for improved efficiency. In this system configuration, where a battery 560 can be an auxiliary energy source, the energy specification of a battery 560 can for example be optimized for safe operation based on the minimum electrical power output equivalent to the maximum continuous power of an intelligent mobile environmental control system 900 for a period of time (for example 10 minutes requirement for a battery versus 10 hours of the system requirement). A battery 560 can either be recharged by for example the electrical energy transferred from a fuel cell 580, when energy is available, or from, depending on the modes, other on board sources of energy such as solar panels or wind turbine, if available, or by the power grid or any locally stored electrical energy when the system is stationary and connected to the power grid or locally stored electrical energy.

Through a battery 560 controlled by a control subsystem 500, a control subsystem 500 can manage the distribution of electrical energy from various sources and the electrical requirement of the system and of each electrical device, as illustrated in FIG. 2.3. An example of a control subsystem 500 electrical energy management can be to combine electrical energy from various sources, by doing so creating a hybrid source. In this configuration where various electrical energy sources are available, a control subsystem 500 can direct a portion of the total required energy generated by each source of energy, including but not limited to, solar panels and or wind turbines and or a battery 560 itself, with the electrical energy generated by a fuel cell 580, to a battery 560; by this means creating a hybrid electrical energy arrangement used to power all systems requiring electrical energy via an inverter 577 (transforming DC to AC).

When an intelligent mobile environmental control system 900 is in stand-by and a fluid conditioning subsystem 700 "on" mode, operating but connected to the power grid, a control subsystem 500 through a battery 560 controlled by a control subsystem 500 can allow for the electrical energy to be supplied from the power grid via for example a rectifier 501 (transforming AC to DC) or via a Voltage Frequency Control VFC unit, to any systems requiring electrical energy.

Another hybrid configuration, depending on the availability of the electrical power from the power grid, for example when the system is connected to a conventional low power, low voltage power grid plug (for example 15-20 A, 110-220V), a control subsystem 500, through a battery 560, can combine and direct the partial electrical energy from the power grid with the electrical energy coming from a fuel cell 580, supplying the balance of power to fulfill system operation requirements and reducing fuel consumption; or with the electrical energy from other on-board sources or from a combination of all available sources of electrical energy.

When an intelligent mobile environmental control system 900 is in stand-by and a fluid conditioning subsystem 700 "off" mode, connected to the power grid but with no refrigeration requirement, the power grid can provide electrical current to the battery 560, controlled by a control subsystem 500, for recharging purposes via the rectifier 501 (transforming AC to DC current) or via any VFC unit.

As will be appreciated by those skilled in the relevant arts, systems requiring electrical power can comprise all subsystems, components and devices of an intelligent mobile environmental control system 900 and can include electrical devices of the transport vehicle.

In various aspects and embodiments, an energy system 600 can comprise a battery 560 that can be an auxiliary energy source. A battery 560 energy capacity can be specified with any energy payload including a payload sufficient to meet all mission energy requirements. In the case, for example, that a battery 560 electric energy output is equal to a fuel cell 580 electrical energy output, an intelligent mobile environmental control system 900 can be powered by a hybrid energy source comprising of a fuel cell and a battery and can operate by using energy from both sources where a fuel cell 580 can operate as a range extender and can operate to recharge a battery 560. In the case that a battery 560 is specified to provide the maximum electric energy to the system for a mission, an energy subsystem 600 does not require a fuel cell 580 or its accessories and can be replaced by a battery 560 being, in this case, the sole source of electric energy storage.

In further aspects and embodiments, the disclosure provides novel methods of thermal energy management between an energy subsystem 600, a fluid conditioning subsystem 700, a cargo space conditioning subsystem 800 controlled by a control subsystem 500 of an intelligent mobile environmental control system 900 as illustrated for example in FIG. 3.

A by-product of a fuel cell 580 or of a battery 560 operation often includes the generation of heat. For efficient and proper running operation of a fuel cell 580 or of a battery 560, in such embodiments the heat that is generated by a fuel cell 580 or of a battery 560 can be reduced in temperature and or/rejected. In some embodiments, a fuel cell temperature is to be maintained in the 80° C./176° F. to 100° C./212° F. range and a battery temperature is to be maintained in the 20° C./68° F. to 50° C./122° F. range.

A synergy of this invention, illustrated in FIG. 3.1, can be to use a fluid conditioning subsystem 700 and or a cargo space conditioning subsystem 800 of an intelligent mobile environment control system 900 and controlled by a control subsystem 500 to cool a fuel cell 580 or to cool a battery 560.

To achieve this level of synergy, different cargo space conditioning subsystem 800 and or energy subsystem 600 thermal management modes, can be considered, as illustrated in FIG. 3.1, and can comprise (1) a cooling mode, (2) a heating mode, (3) an energy subsystem warmup mode and or (4) a defrosting mode.

When the system 900 is configured in cooling mode, as for example represented in FIG. 3.3, a first conditioning fluid flow, that can be a refrigerant flow, exiting a fluid conditioning subsystem 700 and its external heat exchanger 660, operating as a condenser, can be routed to at least of one of two distinct heat exchangers that can be acting as evaporators. The first flow of a first conditioning fluid can be channeled to an internal heat exchanger 780 of a cargo space conditioning subsystem 800, operating as an evaporator, by a conditioned fluid delivery subsystem 680, to exchange cooling energy with a second conditioning fluid, referred to as an internal heat exchanger intake fluid, that can be air, propelled by an internal smart motor fan 778 and controlled by at least a valve 779, a fluid conditioning subsystem ECU 699 and or a control subsystem 500. This second conditioning fluid can be channeled to an internal heat exchanger 780 and can include for example ambient air and or internal air and or a combination of both as illustrated in FIG. 4.3.

Internal air can include stable conditioned air coming from a cargo space 770 and or air coming from a fuel cell 580 outflow with reduced oxygen air when oxygen reduction is required for certain types of perishable cargo and or conditioned air having gone through a heating energy transfer with a cargo space fluid by the use of a cargo space ventilation heat recuperator 759.

Flowing through an internal heat exchanger 780, internal fluid temperature can be reduced, transforming it to a conditioned fluid that can be directed by an internal smart motor fan 778 and at least one valve 779 to a cargo space filter to remove undesirable particles and compounds and humidity while its sensor measures air pressure, humidity and purity, and can be transferred to a cargo space 770, achieving the conditioning of this space or volume.

The second flow of a first conditioning fluid, that can be a liquid refrigerant, exiting a fluid conditioning subsystem 700 can be channeled to at least one energy subsystem heat exchanger, that can include a fuel cell heat exchanger 576 or a battery heat exchanger 558, operating as an evaporator, controlled by valves, an energy subsystem ECU 599 and or a control subsystem 500, to exchange cooling energy with a third conditioning fluid from a fuel cell 580 and or battery 560 cooling system. By this mean, the temperature of a fuel cell or battery can be reduced during their operation.

After transfer of cooling energy with both internal intake fluid and energy subsystem cooling subsystem fluid, the first conditioning fluid that is in its liquid state, can change to a gaseous state and can be directed back to the main fluid flow by a conditioned fluid delivery subsystem 680, where the first conditioning fluid circulates in a close loop. This closed loop can consist of flowing the then gaseous fluid to a fluid suction accumulator where it can be stored and accumulated and of flowing the gaseous fluid to a fluid compressor 670 where its pressure and temperature can be increased. The gaseous fluid can then flow to an external heat exchanger 660 to transfer thermal energy with a fourth conditioning fluid that can be ambient air, propelled by an external smart motor fan 668 and controlled by at least one valve. During this thermal energy transfer, the gaseous fluid temperature can be reduced and the gaseous fluid state changed to a liquid state, where the forth conditioning fluid can be exhausted to an ambient environment. The now liquid first conditioning fluid can then be channeled to an expansion valve reducing further the pressure of the liquid fluid and its temperature. Finalizing the first conditioning fluid close loop, the conditioned liquid first conditioning fluid can travel back to an internal heat exchanger 780 of a cargo space conditioning subsystem 800 and/or to at least one energy subsystem 600 heat exchanger 576 or 558.

A conditioned fluid delivery subsystem 680 can comprise one or several valves 677, 678, 679 and at least one reversing valve 676 allowing the conditioned fluid delivery subsystem 680 to receive a first conditioning fluid from and or direct the same first conditioning fluid to the various assemblies of three (3) subsystems; a fluid conditioning subsystem 700, that can include at least one compressor 670, at least one external heat exchanger 660 and or a catalytic combustor 650; an energy subsystem 600 that can include at least one heat exchanger 576 and 558; a cargo space conditioning subsystem 800 that can include at least one heat exchanger 780.

As detailed above, for example, a further synergy of the subsystems can be demonstrated by the use of a fluid conditioning subsystem 700 as a cooling subsystem for an energy subsystem 600 increasing the efficiency of an intelligent mobile environmental control system 900. In this case, high efficiency can translate into system simplification and consequently system quality and durability improvements, into system weight reduction and into capital investment reduction by reducing or eliminating the need for a separate fuel cell or battery cooling device. Additionally, durability improvements of a fuel cell 580 and of a battery 560 can be achieved by avoiding high temperature operation.

When the system is configured in heating mode, two flows of a first conditioning fluid, that can be refrigerant flows, can be reversed to two distinct evaporators. In heating mode, a fluid conditioning subsystem 700 can be configured in reverse mode, operating as a heat pump, to condition a second conditioning fluid that can be internal heat exchanger intake air. This can be achieved by using a reversing valve 676 of a conditioned fluid delivery subsystem 680 to direct a first flow of a first conditioning fluid, in its gas state, to an internal heat exchanger 780 operating as a condenser to exchange heating energy with a second conditioning fluid. The second conditioning fluid can be propelled by an internal smart motor fan 778 controlled by at least one valve, by a fluid conditioning subsystem ECU 699 and or a control subsystem 500 and can be routed through an internal heat exchanger 780. This can result in an increase of the temperature of a second conditioning fluid transforming it to a conditioned second conditioning fluid that can be directed by an internal smart motor fan 778 and at least one valve to at least one cargo air filter to remove undesirable particles and compounds and humidity while its sensor measures air pressure, humidity and purity, and can be transferred to a cargo space 770, consequently increasing the temperature of a cargo space 770.

After transfer of heating energy with a second conditioning fluid, via an internal heat exchanger 780, the first flow of a first conditioning fluid, in its gas state, can change to a liquid state and be directed back to an external heat exchanger 660 operating as evaporator, by at least one valve where the flows of a first conditioning fluid circulate in a closed loop.

This closed loop can consist of flowing a first flow of first conditioning fluid, in its liquid form, from an internal heat exchanger 780 to an external heat exchanger 660 where it can exchange heating energy with a fourth conditioning fluid that can be ambient air, propelled by an external smart motor fan 668 and controlled by at least one valve. During this heat exchange, a liquid first conditioning fluid temperature can be increased and a liquid first conditioning fluid state can change to a gaseous state. The gaseous first conditioning fluid can then be channeled through at least one control reversing valve to a first conditioning fluid suction accumulator where it is stored and accumulated. The gaseous first conditioning fluid can then flow to a compressor 670 where its pressure and temperature are increased, and closing the loop, a first flow of first conditioning fluid flows back to an internal heat exchanger 780.

In such embodiments, a second flow of a first conditioning fluid, in liquid state, can be channeled to a fuel cell heat exchanger 576 or a battery heat exchanger 558, both operating as evaporators, controlled by at least one valve, an energy subsystem ECU 599 and a control subsystem 500, and exchange cooling energy with a third conditioning fluid from a fuel cell 580 and or a battery 560 cooling subsystem to reduce the temperature of this fluid and to reduce the temperature of a fuel cell 580 and or a battery 560 during their operation.

After exchange of cooling energy with at least one energy subsystem third conditioning cooling fluid, the second flow of first conditioning fluid in liquid state can change to a gaseous state and be directed back to the main gaseous first conditioning fluid flow by a control reversing valve where the second first conditioning flow circulates in a closed loop.

This closed loop can consist of flowing the then gaseous first conditioning fluid to a suction accumulator where it can be stored and accumulated and of flowing a gaseous first conditioning fluid to a compressor 670 where its pressure and temperature can be increased, and, to finalize the closed loop, of flowing it back to an internal heat exchanger 780, operating as a condenser.

In some specific cases, which can be determined by a control subsystem 500 or other control, when the specified cargo space temperature is elevated, in particular during the pull up cycle, and when the heating energy generated by an energy subsystem 600 is not sufficient to increase the temperature of a cargo space 770, and when the ambient environmental condition is too cold with a low level of humidity making the enthalpy of the ambient air too low to efficiently operate a fluid conditioning subsystem 700 in reverse mode using an external heat exchanger 660, operating as an evaporator, a catalytic combustor 650 that can include an integrated evaporator, can generate required or otherwise desired levels of heating energy to be exchanged with a first conditioning fluid. This can for example be achieved by a catalytic or energy ignited combustor 650 through a flameless or conventional combustion of hydrogen delivered from an hydrogen tank 589 via a pressure regulator 587 with its sensor measuring hydrogen intake and output pressure, with a fourth conditioning fluid that can be ambient air delivered from an external smart motor fan 668. Hydrogen and fourth conditioning fluid deliveries can be controlled by at least one valve as well as by a catalytic combustor ECU and/or a control subsystem 500.

During such flameless combustion, only air (depleted O2 air) and water are exhausted, both of which can be reused within an intelligent mobile environment control system 900. In particular the water, after separation from the depleted oxygen air, can be pumped to a humidifier 578 for humidification of the air to be intake by a fuel cell 580.

The heating energy provided by this combustion can be exchanged for example using the catalytic combustor 650 integrated evaporator with a first conditioning fluid that can be a refrigerant. When the conditions listed above apply, a catalytic combustor ECU and or a control subsystem 500 can send signals to a conditioned fluid delivery subsystem 680 to direct a liquid first conditioning fluid flow to a catalytic combustor 650. After the exchange of the heating energy with an evaporator of a catalytic combustor 650, a liquid first conditioning fluid state can change to a gaseous state and can be directed by at least one reversing valve to an internal heat exchanger 780, operating as a condenser, transferring heating energy to a cargo space 770 as described above when a fluid conditioning subsystem is operating as a heat pump. In another aspect and embodiment the heating energy provided by this combustion can be exchanged through any other means with an intelligent mobile environmental system 900.

In heating mode, the temperature increase of a cargo space 770 can also be achieved by, for example, propelling either hot reduced oxygen air, by-product of a fuel cell 580's operation, described later in this embodiment, or by propelling a conditioned second conditioning fluid that can be hot makeup air from a reverse fluid conditioning subsystem 700 (heat pump) to a cargo space 770, or by propelling a combination of both. By such means, the temperature of a cargo space 770 can be increased using the total system heating energy, i.e. the available energy from a fuel cell 580 of an energy subsystem 600, energy from a heat pump being a fluid conditioning subsystem 700 and from the energy transfer of a fuel cell 580 and or of a battery 560 via a first conditioning fluid.

Another configuration, listed in the FIG. 3.2, can be when the energy subsystem 600 is in warmup mode. A fuel cell 580 or a battery 560 can for example be warmed prior to operating as required or desired (typically, specified warmup temperature range from 40° C./104° F. to 80° C./176° F. for a fuel cell and range from −10° C./14° F. to 10° C./50° F. for a battery), for efficiency, wear and durability management of a fuel cell or a battery. In such a mode, only one first conditioning fluid flow can be active, the other being shut-off by at least one valve.

In this warm up mode configuration and depending of the operating conditions, a fluid conditioning subsystem 700 can be powered by the grid and or by an external power source and or by a battery 560 and or a catalytic combustor 650, and can be configured in reverse mode, operating as a heat pump, to provide heating energy to a fuel cell 580 and or a battery 560. This can be achieved by a control reversing valve of a conditioned fluid delivery subsystem 680 directing the gaseous first conditioning fluid to a fuel cell heat exchanger 576 and or to a battery heat exchanger 588, operating as condenser, to exchange heating energy with a third conditioning fluid of a cooling subsystem(s) of an energy subsystem 600, to increase the temperature of this fluid and consequently warming a fuel cell 580 and or a battery 560. After exchange of heating energy with a third conditioning fluid, the gaseous first conditioning fluid state can change to a liquid state and can be directed back to a fluid conditioning subsystem external heat exchanger 660, operating as a evaporator, by a conditioned fluid delivery subsystem 680 where a first conditioning fluid circulates in a closed loop.

A closed loop in accordance with such an example can consist of flowing a liquid first conditioning fluid from a fuel cell heat exchanger 576 and or a battery heat exchanger 588 to an external heat exchanger 660 where it exchanges heating energy with a fourth conditioning fluid than can be ambient air propelled by an external smart motor fan 668 and controlled by at least one valve. During such a heat exchange, a liquid first conditioning fluid temperature can be increased and a liquid first conditioning fluid state can change to a gaseous state. The gaseous first conditioning fluid can then be channeled through a conditioned fluid delivery subsystem 680 to a suction accumulator where it can be stored and accumulated. The gaseous first conditioning fluid can then flow to a compressor 670 where its pressure and temperature can be increased, and closing the loop, a first conditioning fluid can flow back to at least one energy subsystem 600 heat exchanger.

Similar to the condition described during the heating mode, in some specific cases, when for example the atmospheric condition is too cold with a low level of humidity making the enthalpy of the ambient air too low to efficiently operate a fluid conditioning subsystem 700 in reverse mode using an external heat exchanger 660, operating as an evaporator, a catalytic combustor 650 that can include an integrated evaporator can generate the required heating energy to a liquid first conditioning fluid. During the flameless combustion, exhaust can be limited to air (depleted O2) and water that can be reused within the system. In particular such water, after separation from the depleted oxygen air, can be pumped to a humidifier 578 for humidification of the air to be intake by the fuel cell 580.

After exchange of the heating energy with a catalytic combustor 650, a liquid first conditioning fluid state can change to a gaseous state that can be directed by a conditioned fluid delivery subsystem 680 to at least one energy subsystem 600 heat exchanger transferring heating energy to a fuel cell 580 or a battery 560 as described in this embodiment. In further aspects and embodiments the heating energy provided by this combustion can be exchanged through any other means with an intelligent mobile environmental system 900.

After exchange of the heating energy with a catalytic combustor 650, a liquid first conditioning fluid state can change to a gaseous state that can be directed by a conditioned fluid delivery subsystem 680 to at least one energy subsystem 600 heat exchanger transferring heating energy to a fuel cell 580 or a battery 560 as described in this embodiment. In another aspect and embodiment the heating energy provided by this combustion can be exchanged through any other means with an intelligent mobile environmental system 900.

Once the sequence of an energy subsystem warmup mode is conducted, an intelligent mobile environment control system 900, controlled by a fluid conditioning subsystem ECU 699 and a control subsystem 500, can reconfigure itself to operate the sequence of a fluid conditioning subsystem in cooling, heating or defrosting mode.

A further configuration in accordance with such embodiments is when the system is configured in defrosting mode, listed in FIG. 3.2. Defrosting of fluid conditioning or cargo space conditioning subsystems can for example be required at startup of operation and from time to time during steady operation due to ice build-up when the atmospheric condition is warm, hot and humid and depending on the temperature of the cargo space. The defrosting mode configuration is similar to the heating mode configuration where two first conditioning fluid flows are reversed to two distinct evaporators, as described in this embodiment.

Defrosting of a fluid conditioning or a cargo space conditioning subsystem can be achieved by flowing a conditioned first conditioning fluid respectively through a heat exchanger 660 or 780, operating as a condenser, melting and eliminating the ice build-up on the condenser. In this case, only hot conditioned first conditioning fluid is flowing through heat exchangers with no heat exchange with other conditioning fluids and a fluid conditioning subsystem can be powered by a fuel cell 580 and or a battery 560 and or the power grid and or any external power source. In the scenario that additional heating energy is required to defrost a heat exchanger 780 and that a fluid conditioning subsystem 700 is powered by a fuel cell 580, hot reduced oxygen air (at 80° C.), by-product of the fuel cell 580's operation, can be delivered to an internal heat exchanger 780, using an internal smart motor fan 778 and at least one valve. By such means, the ice build-up can be melted and eliminated by flowing hot reduced oxygen air and conditioned first conditioning fluid through an internal heat exchanger 780. After passing through the internal heat exchanger, hot reduced oxygen air can be either exhausted to the atmosphere or channeled to a cargo space 770 when permitted by the cargo space air composition and temperature requirements.

In the event that additional heating energy is required while a fuel cell and or a battery is not operating and the system is connected to the power grid, defrosting can be achieved by channeling hot conditioned second conditioning fluid that can be makeup air to an internal heat exchanger 780, operating as a condenser, from the heat pump, being the reverse fluid conditioning subsystem 700, powered by the grid, and configure in heating mode. Other defrosting alternatives are to operate a direct electrical resistance heating device, powered by a fuel cell 580 and or a battery 560 and or the power grid or to combine the above solutions, i.e. defrosting by flowing conditioned first conditioning fluid and or hot reduced oxygen air and or conditioned second conditioning fluid and or defrosting by operating an electrical heating device.

Example system configurations in heating mode, energy subsystem warmup mode and defrosting mode construct another synergy and interdependency that maximizes or otherwise promotes overall energy efficiency. This efficiency can for example be obtained primarily by eliminating the need for a separate fuel cell or battery heater device simplifying the system architecture and consequently improving the system quality and durability, reducing the system weight and capital investment; and by reducing the heat pump power requirement in the heating and defrosting mode.

Defrosting of a heat exchanger(s) can be controlled by a fluid conditioning ECU 699 and or a control subsystem 500. After defrosting, a fluid conditioning subsystem 700 can reconfigure itself in cooling or heating mode, or to operate the pull down or pull up cycle described in this embodiment.

TRU pull down and pull up cycles can be based on or otherwise informed by goods transportation quality guidelines and best practices (examples can be found in the IRTA-GCCA Sanitary Transportation of Human and Animal Food (STF)/Refrigerated Transportation Best Practices Guide) specifying that, prior to loading goods for transportation, not only should the TRU be free of frost, ice buildup from previous shipments but also a cargo space of the TRU be at the specified set up temperature, requiring to either pull down the temperature from the actual cargo space temperature or to pull it up. The various novel aspects and embodiments disclosed herein describe specific advantageous ways of accomplishing the goals of such guidelines in an energy and fuel efficient manner.

During the various cycles disclosed herein, and depending on operating conditions that can be factors such as ambient conditions, stand by duration of the unit prior to the next shipment, shipment specifications, etc., an intelligent mobile environment control system 900 can run in continuous operation providing the necessary heating and or cooling energy to obtain and maintain required or otherwise desirable temperatures, humidity, and other conditions for a cargo space 770, prior to cargo loading. This required energy can be important, in particular during pull down cycles compared to heating and/or cooling energy requirements in steady state operation during transportation where the system will adjust to maintain the specified temperature.

In order to optimize or otherwise increase the efficiency of subsystems and or components in accordance with the various aspects and embodiments of the invention, during these pull up/down cycles, various controlled parameters and characteristics can be adjusted by a control subsystem 500. As in some embodiments these cycles occur when there is a possibility to connect the system to the power grid or locally stored electrical energy, eliminating or reducing the required electrical energy to be generated by a fuel cell and or a battery, a control subsystem 500 can configure the system to operate in stand-by mode, connected to the grid, that is described in this embodiment.

Where for example power grid connection is not an option, a fuel cell 580 and or a battery 560 or other onboard power sources such as, but not limited to, solar panels or wind turbines or a combination of these power sources can supply electrical energy to the system where other parameters, characteristics and conditioning instructions will be controlled by a control subsystem 500, such as, but not limited to, the duration of the pull up or down cycle, the number of and duration of defrosting cycles to optimize the system efficiency by minimizing energy consumption.

In various embodiments configurations of a fluid conditioning subsystem 700 during the pull down and pull up cycles are similar to respectively the configuration in cooling mode and in heating mode. Once the pull down is conducted, a fluid conditioning subsystem 700 controlled by a fluid conditioning ECU 699 and/or a control subsystem 500, can continue to operate in cooling mode. Once the pull up cycle is conducted, a fluid conditioning subsystem 700 controlled by a fluid conditioning ECU 699 and/or a control subsystem 500, can continue to operate in heating mode.

Another method to optimize the system efficiency by minimizing energy consumption can be to vary the flow of a first conditioning fluid in relation to the required system performance and in particular to the cargo space 770 temperature, humidity and conditioning requirements.

In various aspects and embodiments, a fluid conditioning subsystem 700 can be configured to allow speed variation of a first conditioning fluid compressor 670. A motor 669, of a first conditioning fluid compressor 670 (ideally with direct connection) that can deliver compressed first conditioning fluid to the system, can be supplied with AC electric current from an inverter 556 that can pass through a AC/DC rectifier, through a DC link filter and through a VFC (Voltage & Frequency Control) inverter converting back the current to AC and can allow variable frequency and voltage output to a motor 669. The rotating speed of a first conditioning fluid compressor 670 can be transmitted to its motor by communication between a compressor 670 with a voltage & frequency control module, and consequently with a VFC inverter, with a fluid conditioning subsystem ECU 699 and or a control subsystem 500. By such means, the rotating speed of a first conditioning fluid compressor 670 can vary as well as the compressed first conditioning fluid flow to be delivered to the system. By this method, infinitely variable flow of first conditioning fluid, delivered to the system, can be achieved, varying first conditioning fluid flow based on operating conditions and conditioning instructions.

A further aspect and embodiment, a cargo space and its cargo and or its dunnage can be used as a thermal storage capacity where a cargo space 770 fluid can exchange thermal energy to an energy subsystem through directing directly cargo space conditioned air to a fuel cell 580 and or a battery 560 to condition the environment of a fuel cell 580 and or battery 560 allowing efficient and or durable operation of an intelligent mobile environmental control system 900.

This section of the embodiment describes novel methods of air management between an energy subsystem 600 and a cargo space conditioning subsystem 800 controlled by a control subsystem 500 of an intelligent mobile environmental control system 900, as illustrated in FIG. 4.

When the energy subsystem 600 comprises at least one fuel cell 580, an additional synergy can occur between an energy subsystem 600 and a cargo space conditioning subsystem 800. In this configuration of an intelligent mobile environmental control system 900, fluid and conditioned fluid can represent respectively air and conditioned air. This additional synergy can provide efficiency improvements of an intelligent mobile environmental system 900 by directing a stable conditioned air flow from a cargo space conditioning subsystem 800 to a fuel cell 580 air intake for reaction with other fuel cell consumables as illustrated in FIG. 2. This efficiency improvement can combine the benefit of cooling or heating a fuel cell 580, requirement described later in this embodiment, of providing cool dense oxygen rich air, and the benefit of venting or ex-filtrating a portion of the air of a cargo space conditioning subsystem 800 to modify the air chemistry when required (discussed later). These efficiency improvements of the system can be translated into a durability increase and efficiency of the fuel cell through reducing operating power requirements.

To achieve the first set of benefits of providing cool dense oxygen rich air to a fuel cell 580, and or venting or ex-filtrating a portion of the air of a cargo space conditioning subsystem 800, a cargo space conditioning subsystem 800 can comprise an air management subsystem 760 illustrated in FIGS. 4.3 and 4.4. Depending on the ambient air conditions and on a cargo space 770 air temperature and air composition, an air management subsystem 760 can direct air for reaction within a fuel cell 780 from either conditioned internal or ambient air, or a combination.

Conditioned internal air can include stable conditioned air from a cargo space 770, conditioned air delivered by a cargo space heat recuperator 759 and/or conditioned air delivered by an internal heat exchanger 780.

In such configuration, an air management subsystem 760 can receive stable conditioned air from a cargo space 770 that can be controlled and monitored by sensors and at least one valve 756 that can direct stable conditioned air to a cargo space heat recuperator 759 or to a cargo space conditioning subsystem 800 as return air (typically 20% of a cargo space air is returned to the evaporator).

If required, depending on the temperature and or other conditions, stable conditioned air that can be directed to a cargo space heat recuperator 759 can exchange cooling energy with ambient air propelled by a fan 757 or can be inactive. When a cargo space heat recuperator 759 is active, the transfer of cooling energy can increase the temperature of the stable conditioned air coming from a cargo space 770 to the temperature required prior to the intake of a fuel cell or prior to compression, at the intake of a fuel cell reaction air compressor 570, and to the temperature required by a fuel cell 580 for reaction air (which is typically between 15° C. and 25° C.; 59° F. and 77° F.).

During the heat exchange, air temperatures being monitored, ambient air can be cooled to a temperature lower than the temperature required at the intake of a fuel cell reaction air compressor 570. This conditioned air, depending on its temperature, can then be either reintroduced, by a valve 754, to the flow of stable conditioned air from a cargo space 770 for use as fuel cell reaction air, can be directed to the air flow of a cargo space conditioning subsystem 800 for use as air intake of an internal heat exchanger 780 or can be exhausted.

When the conditions require additional conditioned air to be directed to a fuel cell 780, for example when stable conditioned air from a cargo space 780 is not sufficient or when cargo space air ventilation is not required, conditioned air from an internal heat exchanger 780 of a cargo space condition subsystem 800 can be directed to the conditioned air flow to be provided to a fuel cell 580 air intake by the use of valves 777 and 753.

Cargo space air ventilation requirement, controlled by a control subsystem 500, can be evaluated with respect to the quantity of air that needs to be exchanged between a cargo space air and ambient air and or fuel cell reduced oxygen air outflow depending on their respective temperature and composition to achieve the air temperature and composition setting in a cargo space 770.

When the conditions don't require or allow the supply of stable conditioned air from a cargo space 770 to a fuel cell 580, for example when the ambient air conditions are at or near to the optimal conditions of fuel cell reaction air or for example when stable conditioned air conditions from a cargo space 780 (in particular air composition, temperature) are not at optimal fuel cell air intake requirements, or when a cargo space 780 requires a large amount of return air, or when a cargo space 780 requires ventilation, the stable conditioned air from a cargo space 780 can be returned to a cargo space environmental control subsystem 800 or purged to an ambient environment by the use of a valve 755 and ambient air or conditioned air from the internal heat exchanger 780 can be directed to a fuel cell 580 for air intake.

Prior to being delivered to a fuel cell 580, conditioned internal or ambient air, at the required temperature prior to fuel cell intake or compression, can be channeled to a filter 579, to remove potential non desirable particles and compounds where its sensor measures air pressure, oxygen concentration, purity, and/or other conditions. It can then be channeled to a compressor 570 for compression during which the air temperature can be further increased to the final temperature required by a fuel cell 580. After being pressurized, conditioned internal or external ambient air can flow to a humidifier 578 increasing the water content in the air as required by a fuel cell 580 while the humidifier sensor measures air temperature, humidity and pressure. Water input to a humidifier 578 can be directed from a water separator 577 where water can be generated by a fuel cell 580 as a byproduct of its operation. The then processed stable conditioned, pressurized, and purified air can be delivered to a fuel cell 580 controlled by valve(s), an energy subsystem ECU 599 as well as by a control subsystem 500, and optionally by other systems or components as desired Further benefits can be achieved by directing the same stable conditioned air flow to a fuel cell 580. This stable conditioned air flow can reduce or maintain a fuel Cell 580 operating temperature during the fuel cell reaction process in its operating range that can be 80° C./176° F. to 100° C./212° F. and can in some cases permit higher power output without reducing durability.

The benefits described above, that are related to a fuel cell 580 air intake and a cargo space 780 air outflow, provide efficiency improvements of the system that can result in a durability increase of a fuel cell through reducing operating power, temperature and contaminants through the intake of conditioned and purified air that can minimize the effect of fuel cell catalyst poisoning, that can be irreversible, due to intake of dry, impure air containing for example but not limited to $SO_2$.

For example fuel cell operating power reduction can be estimated at up to 8% (or 0.6 kW) when taking into account the power saved to pump air to a fuel cell and the power saved to cool a fuel cell considering a fuel cell heating energy generation at 20% of the total fuel cell energy, the thermodynamic and air density laws and considering a conditioned air intake temperature at +15° C. versus ambient air intake temperature at +50° C. at equal pressure of 3 bar.

As previously described when the energy subsystem 600 comprises at least one fuel cell 580, in addition to producing electricity and heat, in various embodiments a fuel cell 580 also exhausts hot reduced oxygen air and water. In startup or steady operations, the hot reduced oxygen air can be used as a source of heating energy to either heat a cargo space 770 when oxygen reduction and air chemistry modification is required for certain type of perishable products or to defrost the system internal heat exchanger 780. Additionally and as seen previously, the hot reduced oxygen air, after been cooled during heat exchange with the system internal heat exchanger 780, operating as an evaporator, can also provide oxygen reduction during the cooling mode to a cargo space conditioning subsystem 800 when oxygen reduction and air chemistry modification is required for certain types of perishable or environmentally sensitive cargo.

Air chemistry modification can be required, or otherwise desirable, when perishable goods like fruits and vegetables are transported with fresh air for refrigeration (temperature between +2° C./36° F. to +15° C./59° F.). As these products continue, in these conditions, to respire, to age, to release water, to release carbon dioxide, to release ethylene and heat, reducing the amount of oxygen in a cargo space 770 air permits to minimize the quantity of these releases. The air chemistry modification can be achieved by ventilation of a cargo space that can be achieved by replacing some of cargo space air with either reduced oxygen air from a fuel cell 580 or with ambient air or with conditioned air or with a combination of these solutions. The average rate of a cargo space air ventilation is up to 30-40% of its volume per hour depending on the type and quantity of cargo. The ventilation of a cargo space can be done by the use of valves controlled by a fluid conditioning subsystem ECU 699 and a control subsystem 500.

As illustrated in FIG. 4.3, internal intake air can represent intake air that can be directed to an internal heat exchanger 780. Internal intake air can comprise ambient air, conditioned air, reduced oxygen air, return air or a combination of all. In embodiments where internal intake air comprises fully or partially reduced oxygen air from a fuel cell 580, conditioned air made from heat exchange with an internal heat exchanger 780 can be directed by valves to an air filter to remove non desirable particles and compounds and remaining water content, while at least one sensor measures air pressure, humidity and purity, and then can be directed to a cargo space 770.

In such configurations of a transportation refrigeration unit where reduced oxygen air can be directed into a cargo space 770, fuel cell reaction air can be supplied from several sources of conditioned air, taking into consideration the air composition and in particular the amount of N2 within the air that is acceptable for fuel cell operation.

In addition to fuel cell reaction air sources previously described and illustrated in FIG. 4.5, an alternative supply of conditioned air for a fuel cell 580 can include varying stable air flow coming from a cargo space conditioning subsystem 800 that passes through an air management subsystem 760. By varying stable air flow, increasing or decreasing the amount of stable air directed to a fuel cell 580, the specified amount of oxygen (O2) can still be provided to a fuel cell 580 even with a higher content of nitrogen (N2) in the air composition.

In various embodiments, an intelligent mobile environmental control system 900 can be configured to allow speed variation of an air compressor 570. A motor, of an air compressor 570 (ideally with direct connection) that can deliver compressed reaction air to a fuel cell 580, can be supplied with AC electric current from an inverter 556 that can pass through a AC/DC rectifier, through a DC link filter and through the VFC (Voltage & Frequency Control) inverter converting the current to AC and can allow variable frequency and voltage output to a motor of an air compressor 570. The rotating speed of an air compressor 570 can be transmitted to its motor by communication between an air compressor 570 with a voltage & frequency control module, and consequently with a VFC inverter, with an energy subsystem ECU 599 and a control subsystem 500. By such means, the rotating speed of an air compressor 570 can vary as well as the compressed air flow to be delivered to a fuel cell 580.

By such methods, almost infinite variable flow of fuel cell reaction air, delivered to a fuel cell 580, can be achieved, varying fuel cell reaction air intake flow based on conditioning instructions.

In the same manner, all air fans of an intelligent mobile environmental control system 900 controlled by a fluid conditioning subsystem ECU 699 and control subsystem 500, can be supplied with electrical current from an inverter 556 and equipped with smart motors, can vary their motor speed and can provide variation of air flow based on conditioning instructions.

Another alternative to supply conditioned air to a fuel cell intake can be a blended solution combining conditioned air from a cargo space conditioning subsystem 800, from the external environment, from a cargo space 770 with stable air flow variation and controlled by valves and a control subsystem 500.

The distribution of reduced oxygen air to a cargo space 770, generated by a fuel cell 580, represents another synergy and interdependency of the subsystems allowing to improve the overall system efficiency. In this case the efficiency improvement can be measured by the reduction of the perishable product transpiration, respiration, decay, ripening and aging. Additionally the heat generated by these products during their respiration can be reduced and can represent a reduction of approximately 20%*of the cooling capacity requirement, that can be equivalent to 0.8 KW when the ambient temperature is at +50° C. and a cargo space temperature is just above 0° C.

This section of the embodiment describes novel methods for defining optimal conditioning instructions that can be control policies for an intelligent mobile environmental control system 900, in accordance with the invention.

A deep-learning based control subsystem 500 of an intelligent mobile environmental control system 900 can be implemented in the form of hardware-software systems that can estimate, among other values and functions, the transformation function between input operating conditions 400 and output conditioning instructions 200 to provide continuous optimal system performance during the system lifecycle, to anticipate the future state of the system and adjust its configuration to the optimal control policy, to predict and provide optimal mission suggestions to a transport vehicle operator, which may for example include any one or more human and/or non-human operator(s) of any manned or unmanned vehicle(s) operated as autonomous, semi-autonomous, and/or otherwise connected autonomous transport vehicle(s), in order to minimize the fuel consumption and ameliorate a number of additional constraints such as for example a cargo space 770 temperature and air composition, operator requirements, cargo delivery schedule, battery precharge conditioning and durability of the hardware components of the system while maintaining cargo within specified conditions.

Control policies can be defined as a continuously generated set of conditioning instructions 200 which can include one or a set of control parameters and that can take into consideration at least operating conditions 400. Control parameters can influence at least one condition of operating conditions 400.

FIG. 5 illustrates such a control subsystem 500 comprising of at least one signal processing unit that can generate these control policies, that can process data and or signals and that can register the state of the system in general, or the state of at least one of the system subsystems, assemblies, components and fluids, using an array of sensors including sensors attached to the subsystems, assemblies, components or fluid of interest. A control subsystem 500 can also process signals from a transport vehicle 1000 or from external sources and can be configured to generate conditioning instructions 200 based at least in part on signals representing at least one operating condition 400 associated with the transport vehicle 1000.

The relation between operating conditions 400 and conditioning instructions 200 can be represented by transformation functions that can be complex and or non-linear, with its mathematical form being unknown apriori.

Such control policies can be implemented as series of deep neural networks within a control subsystem 500. A deep neural network is a machine learning algorithm consisting of series of layers and differentiable non-linear activation functions which can be used to provide such conditioning instructions 200 to control the behavior of the various subsystems, assemblies and components of an intelligent mobile environmental control system 900.

A control subsystem 500 can receive operating conditions 400 and their readings by collecting their representing signals from internal subsystems comprised within an intelligent mobile environmental control system 900 and or from external systems, including, but not limited, a transport vehicle 1000, other transport vehicles, APIs (Application Programming Interfaces), ITS (Intelligent Transportation Systems) and remote service servers.

A control subsystem 500 can provide conditioning instructions 200 by sending their representing signals to internal subsystems comprised within an intelligent mobile environmental control system 900 and or to a transport vehicle 1000.

As described in this embodiment, conditioning instructions 200 can be influenced by operating conditions 400, being the conditions in which an intelligent mobile environmental control system 900 can operate within and or will operate within.

Some operating conditions can be configurable and can represent environmental conditions that can include functional conditions, where environmental conditions represent the state of the environment surrounding and within a subsystem, or a system and or a transport vehicle. Within these environmental conditions, this embodiment considers but is not limited to, vehicle operating conditions 380, subsystems operating conditions 370, ambient environmental conditions 390, predicted environmental conditions 360, operator conditions 280, mission requirements 260, and mission conditions 240. Operating conditions 400 can include the following:

1. Vehicle and or subsystems operating conditions can represent the environmental conditions surrounding and within a transport vehicle 1000 and or subsystems of an intelligent mobile environmental control system 900.

Vehicle operating conditions 380 can include the states and conditions of a vehicle 1000 and that can include for example but not limited to the vehicle location, vehicle speed, the vehicle energy type, the vehicle insulation type, the vehicle cargo door type and the vehicle cargo door opening or locking status. These operating conditions and their readings can be collected and communicated to a control subsystem 500 via their representative signals coming from a vehicle GPS, and or a transport vehicle 1000 speedometer and or a transport vehicle 1000 control unit, and or any remote service server calls through networks.

Subsystems operating conditions 370 can comprise energy subsystem operating conditions, fluid conditioning subsystem operating conditions and cargo space conditioning subsystem operating conditions. These subsystems operating conditions can include the states and conditions of assemblies, components and fluids within each of these subsystems. Fluids can include fluids in their solid, gaseous or liquid form and can include but not limited to hydrogen, oxygen, nitrogen, air, refrigerant, water. States can include but not limited to pressure, temperature, composition, chemistry, purity, humidity and quantity.

These subsystem operating conditions and their readings can be collected and communicated to a control subsystem 500 via their representative signals coming from sensors and monitoring devices mounted on subsystem assemblies and components and from an energy subsystem ECU 599 and a fluid conditioning subsystem ECU 699.

2. Ambient environmental conditions 390 can represent the ambient environment surrounding a transport vehicle. An ambient environment can comprise, but is not limited to, temperature, chemistry, purity, pressure (barometric), density (altitude), humidity as well as wind speed, wind direction and solar intensity.

These ambient environmental conditions and their readings can be collected and communicated to a control subsystem 500 via their representative signals coming from on board sensors and monitoring devices mounted on a transport vehicle 1000 such as, but not limited to, speedometers, anemometers, wind indicators, altitude sensors, temperature sensors, pressure sensors, hygrometers, solar radiation DNI pyrheliometers, ground temperature and ground emissivity. The ambient environmental condition and their readings can also be collected and communicated to a control subsystem 500 via their representative signals coming from off board data from other vehicles, APIs, ITS or from any remote service server calls through networks or point to point communications and can represent the actual or forecast state of these conditions.

3. Predicted environmental conditions 520, illustrated in FIG. 5.1, can represent, but are not limited to, readings and representative signals on the actual and forecast state of the road status, terrain conditions, route configurations, types of energy station, cargo conditions of transported cargo and driver availability.

Road status can comprise, but are not limited to, readings and their representative signals on the actual and forecast state of the traffic status as well as on fuel and energy station locations for filling or refilling and can be collected and communicated to a control subsystem 500 via off board data from other vehicles, APIs, ITS or from any remote service server calls through networks or point to point communications and can represent the actual or forecast state of these conditions.

Terrain conditions can comprise, but are not limited to, readings and their representative signals on the actual and forecast state of the types of road and their conditions and can be collected and communicated to a control subsystem 500 via off board data from other vehicles, APIs, ITS or from any remote service server calls through networks or point to point communications and can represent the actual or forecast state of these conditions.

Route configurations can comprise, but are not limited to, readings and their representative signals on the actual and forecast state of the types of cargo loading and unloading dock (indoor, outdoor, conditioned . . . ), the types of rest stop (short, long rest, location . . . ), the accessibility to a grid or to other external energy sources and to the types of these external energy source (connection type, current and voltage and rate . . . ). Route configuration readings and their representative signals can be collected and communicated to a control subsystem 500 via off board data from other vehicles, APIs, ITS or from any remote service server calls through networks or point to point communications and can represent the actual or forecast state of these conditions.

Energy station conditions can comprise, but not limited to, readings and their representative signals on the actual and forecast state of the fuel and energy status, i.e. the type of energy, capacity and availability of energy, occupancy at the station, waiting time, and to readings and signals on the cost of energy at stations, current, voltage and power types at stations and on hydrogen types at stations (pressure, H2 phase, purity, cost, flow rate . . . ). Energy station condition readings and their representative signals can be collected and communicated to a control subsystem 500 via off board data from other vehicles, APIs, ITS or from any remote service server calls through networks or point to point communications and can represent the actual or forecast state of these conditions.

Cargo conditions of transported cargo can include, but not limited to, readings and their representative signals on the actual and forecast state of the product behavior and characteristics over time of the transported cargo at various environmental conditions and or the type of cargo monitoring devices and or requirements. The cargo conditions of transported cargo readings and their representative signals can be collected and communicated to a control subsystem 500 via off board data from other vehicles, APIs or from any remote service server calls through networks or point to point communications and can represent the actual or forecast state of these conditions.

Operator conditions 280 can be input by an operator or by a cargo transportation end-user and can represent, but not limited to, readings and their representative signals on the actual and forecast availability and location of drivers and substitutes, and or on biological and stop requirements, operator regulations and or on transportation company operator policies. Operator conditions 280 readings and their representative signals can be collected and communicated to a control subsystem 500 via an operator interface 420, and or APIs, and or remote end-user TMS (Transport Management System), and or remote end-user VRS (Vehicle Routing System) and or from any remote service sever calls through networks.

4. Mission requirements 260 can be input by an operator or by a cargo transportation end-user, and can represent, but are not limited to, readings and their representative signals on the type of cargo, on the type of dunnage, on the temperature requirement of the cargo space, on the air composition requirement of the cargo space, on the destination locations and on the loading and unloading stop locations. Mission requirements 260 readings and their representative signals can be collected and communicated to a control subsystem 500 via an operator interface 420, and or a fluid conditioning subsystem ECU 699 and or a transport vehicle control unit.

5. Mission conditions 240 can be input by an operator or by a cargo transportation end-user, and can represent, but not limited to, readings and their representative signals on the type of route, loading and unloading stop duration, rest stop locations, rest stop duration, refuel and or recharge stop locations, refuel and or recharge stop duration, time between stops and the overall mission duration. Mission conditions 240 readings and their representative signals can be collected and communicated to a control subsystem 500 via an operator interface 420, and or a fluid conditioning subsystem ECU 699 and or a transport vehicle control unit.

As described in this embodiment, a control subsystem 500 can be configured to generate conditioning instructions 200 based at least in part on readings and signals representing at least one operating condition 400 associated with a transport vehicle 1000. These conditioning instructions 200 can include, but not limited to, subsystems instructions 190 and or vehicle instructions 100.

Subsystems instructions 190 can be a vector of configurable parameters and can represent, but not limited to, the instructions to operate at least one subsystem to optimize the system performance. Energy subsystem instructions, fluid conditioning subsystem instructions, cargo space conditioning subsystem instructions are all part of the subsystems instructions 190, and can comprise instructions to modify various control parameters of the assemblies and components of these subsystems.

Control parameters can include but are not limited to the rate of flow of fluids, fluids can include fluids in their gaseous, liquid and solid forms and can include but are not limited to hydrogen, oxygen, nitrogen, air, refrigerant and water. Control parameters can also include the speed and power of motors, power of energy sources, position of valves and switches, the duration of the pull up or down cycle, the number, timing and duration of defrosting cycles as well as the notification of service requirements of at least one component included within the subsystems. These subsystem instructions can result in various modes of operation of an intelligent mobile environmental control system 900 that can include but are not limited to, the cooling, heating, warmup, defrosting, stand-by refrigeration on, stand-by refrigeration off modes, and perform alerting, alarming, recording, logging, data transmitting, displaying, hosting and service notifying functions.

Subsystems instructions 190 readings and their representative signals can be communicated from a control subsystem 500, to a fluid conditioning and or cargo space conditioning subsystems ECU 699 and or to an energy subsystem ECU 599.

Vehicle instructions 100, illustrated in FIGS. 5.2, can represent instructions to a transport vehicle to achieve an optimal mission to optimize the system performance and can include, but not limited to, a vehicle route, speed and direction, route distance, route duration, rest point location, rest period duration, refueling point location, refueling duration, grid and or external energy source connection location, grid and or external energy source connection duration, loading and or unloading location, loading and or unloading frequency and duration, estimated time of arrival, delivery prioritization by cargo product type & state, vehicle stopping, starting, refueling and or recharging, cargo door opening, cargo door locking, grid and or external energy source connection, cabin electric energy transfer and vehicle maintenance and service. These vehicle instructions can result in various modes of operation of a vehicle 1000 that can include but are not limited to, the starting, idling, refueling, connecting to external electric energy source, docking, loading, unloading, driving, stopping modes.

Vehicle instructions 100 readings and their representative signals can be communicated from a control subsystems 500 to an operator interface 420 and or to a transport vehicle 1000 control unit.

Conditioning instructions can be generated by a control subsystem 500 to optimize the system performance of an intelligent mobile environmental control system 900. System performance can include, but is not limited to, cargo temperature, cargo space temperature, cargo space humidity, cargo space fluid composition, cargo space fluid purity, energy consumption, energy quantity, durability and reliability of subsystems, cargo delivery, emissions, battery temperature (pre-conditioning status for charging) and or energy cost. System performance can represent a cumulative value of instantaneous system performance over a period of time and their readings and or absolute values and their representative signals can be communicated from a control subsystem 500 to an operator interface 420 and or any transportation end user remote server.

From the system performance, mission status report can be generated and can include reading reports and recordings on the actual status of system performance and report readings and representative signals can be communicated from a control subsystems 500 to an operator interface 420.

As discussed in this embodiment, a control subsystem 500, illustrated in the FIG. 5.4, can comprise at least one processing unit that can generate at least one of four functions; an optimization function 470, a predictive assistance function 440, a safe state estimation function 460 and a backup control function 450.

In various aspects and embodiments, a control subsystem 500 can be composed of at least one of these multiple functions implemented both as hardware devices (microcontrollers, general purpose processor, application specific hardware circuits, application specific low-powered processors, NAND flash storage devices, spinning-disk hard drives) and as software packages (neural networks and its components, external API client code, external API server code, integration software).

To generate continuous conditioning instructions 200, that will result in optimal system performance, control subsystem 500 can continuously analyze response values, at least one processing unit of a control subsystem 500 can collect operating conditions 400 from various on-board and off-board readings described in this embodiment, can transform and aggregate these conditions into a sensor array 490. A sensor array 490 can be a hardware-software system implemented on the microcontroller device in a format acceptable by the other components of the system.

Response values can also be aggregated into a sensor array 490, can then be stored in a sensor value storage 480 which can be a hardware-software complex used to store some "k" latest readings of these sensors. Storage can be implemented as a hardware device using NAND flash drive, spinning disk drive, or other storage medium. In a similar manner, conditioning instructions 200 can be aggregated and stored in sensor value storage 480.

An optimization function 470 can be based on a deep learning network and can then incorporate the past readings of a sensor array 490 retrieved from a sensor values storage 480 into the decision process on optimal control parameters of subsystems which can be a vector of configurable parameters. These optimal control parameters can be generated based on the current readings of sensors, past readings retrieved from the storage and predictions of the future state of the system made within an optimization function 470. As described in this embodiment, adjustment of these control parameters can allow modifications of their respective operating conditions 400. An optimization function 470 can be trained and implemented on an application specific processor (including, but not limited to Graphical Processing Units) where a neural network can be implemented as a modification of a Long-Short Term Memory algorithm.

A trained optimization function 470 can be achieved in two stages: The first stage can include modeling of a physical intelligent mobile environmental control system using a deep neural network. The relationship between operating conditions 400 and conditioning instructions 200 can be some unknown non-linear function that can be estimated during this first stage of the system built. The second stage can include the learning of optimal control strategy (ies) using the model from the first stage as a proxy for an intelligent mobile environmental control system 900, to simulate the response of the system to a different combination of operating conditions 400. During this stage, an optimization function 470 receives as an input response values of an intelligent mobile environmental control system 900, and outputs conditioning instructions 200 for convergence towards optimal system performance.

As described in the embodiment, an optimization function 470 can achieve continuous optimization of response values by continuously providing conditioning instructions 200 allowing continuous adjustment of control parameters and subsequently of configurable operating conditions and by taking into consideration non-configurable operating conditions.

A second function of a control subsystem 500 can include a predictive assistance function 440 that can be implemented as a software-hardware system and as a combination of different software algorithms including, but not limited to, neural networks. A predictive assistance function 440 can take as an input at least one of the forecast reading of the operating conditions 400 from the sensor array 470, at least one of the response values from a sensor value storage 480 and can produce vehicle instructions 100.

A third function of a control subsystem 500 can include a safe state estimation function 460 that can be implemented in the form of a software application running on a microcontroller or general-purpose processor and can be configured to estimate the stability of the current state of the system based on current readings of operating conditions 400 from a sensor array 470 and or sensor value storage 480 and that can include sensor readings of vehicle and or subsystem operating conditions 380 and of their control parameters. If the current state of the system is judged unstable, the estimation function 460 can engage a backup control function 450.

Finally a fourth function of a control subsystem 500 can include a backup control function 450 that can be implemented as a more or less trivial control algorithm that can control a more limited number of control parameters, for example at least cargo temperature. A backup control function 450 can include driving an intelligent mobile environmental control system 900 into a stable state where the deep-neural network based optimization function 470 can operate.

An operator interface 420 can be a HMI (Human Machine Interface) or any interface that can allow an operator or an end-user of a transport vehicle, being manned or unmanned, to input at least mission requirements 260 and to input mission conditions 240 if available. The same operator interface 420 can allow the same operator to receive readings of vehicle instructions 100 and of a mission status report 20. Such an operator interface 420 can communicate and exchange signal readings of mission requirements 260 and mission conditions 240 to a control subsystem 500 and can receive the result signal readings of a predictive assistance function 440 of a control subsystem 500.

One or various functions of a control subsystem 500 can be performed within at least one control subsystem 500 onboard processing unit or within at least one off board processing unit that can be accessible remotely by a control subsystem 500 onboard processing unit using calls through the same cellular network or any network.

FIG. 5.3 is a matrix presenting examples of various functions of a control subsystem 500 in accordance with various aspects and embodiments of the invention, and examples of operational scenarios in which such functions can be employed, including for examples scenarios in which controllers can intelligently respond to changing route and external conditions and mitigate risk to cargo while minimizing or otherwise optimizing energy consumption.

An example of an intelligent mobile environmental control system 900 efficiency and its optimal control policy being to reduce energy consumption, can be when anticipation and recommended live updates can be sent to an operator requesting a change of the original and or current route to a more efficient route.

For example, when considering a mission route scenario "A" and a predicted alternative route "B" established by a control subsystem 500, where:

Route scenario A is a 500 km route, with traffic, equivalent to a 10 hours journey duration during which loading, shipping and delivering of goods are conducted at a transported temperature of −20° C. (+/−5° C.) and where the ambient conditions are sunny with an ambient air temperature of +20° C.

The anticipated alternative route scenario B is a 500 km route, with no traffic, equivalent to 7 hours and 45 min journey duration during which loading, shipping and delivering of goods are conducted at a transported temperature of −20° C. (+/−5° C.) and where the ambient conditions are with an opaque sky, covered by clouds, and an ambient air temperature of +10° C.

Considering these scenarios and the cooling capacity requirement, $Q_c$, that, in this example, is the sum of the transmission heat load, $Q_t$, and of the solar radiation heat load, $Q_s$, and where:

$$Q_t = K \times S \times \Delta T$$

$Q_t$ unit being in W,

K represents the heat transfer coefficient of the trailer walls and is established at 0.5 W/m$^2$ K, S represents the heat transfer surface area, defined at 150 m$^2$, calculated as the geometric mean of the inside surface area and the outside surface area of the trailer walls, $\Delta T$ is the difference of the internal trailer and external ambient temperatures.

$Q_s$ is assumed a constant based on the allowance of the sun effect table from the 2006 ASHRAE handbook on refrigeration and corresponding at a load of 0.3 kW for the scenario A, We can for example obtain the following cooling capacity requirement for scenario A: Qc=3.3 KW and for scenario B Qc=2.2 KW. Considering the efficiencies of electric motors and of a fuel cell respectively at 85% and 60%, and knowing that the energy of 1 kg of H2=33.3 kWh, we can conclude that the H2 energy and fuel consumption for a 500 km journey and for the defined routes are:

Energy scenario A=65 kWh equivalent to 1.9 kg of H2;

Energy scenario B=34 kWh equivalent to 1.0 kg of H2

Where the Energy=$[(Q_c)/(Eff_m \times Eff_{fc})] \times t$ with

Eff$_m$=Motor Efficiency;

Eff$_{fc}$=fuel cell Efficiency and t=journey duration.

In this example, a saving of 0.9 kg of H2 can be achieved by using the anticipated alternative route scenario B compared to the original route A, equivalent to a 31 kWh of energy saving or a 47% of H2 fuel saving to refrigerate a cargo space. It is important to note that scenario B is not only saving fuel to refrigerate the cargo space but is also saving fuel of the trailer vehicle due to the prediction and the optimized route recommendation B that has a shorter duration and less acceleration (due to the fact that there is no traffic) than the initial route A.

A further attribute of an intelligent mobile environmental control system 900 can be a "hosting" function. The hosting function can allow for hydrogen refueling and or electrical recharging and or transfer of cooling energy to other fix or mobile users (being land, sea or air mobile users that can be manned or unmanned), whenever it is possible, based on conditions managed by a control subsystem 500. This can for example be achieved by communicating remotely, using the same communication protocols, with these users on the available quantity of hydrogen fuel and or on the available quantity of electrical energy and or on the available quantity of conditioned fluid, and by communicating on the current location of transport vehicle with an intelligent mobile environmental control system 900, user vehicles or fix location. It can also be achieved by evaluating and communicating the recommended safe location to conduct such a refueling and or recharging, and or transfer of cooling energy and by evaluating the duration of this event versus the actual mode of an intelligent mobile environmental control system 900.

The fuel recharging operation can be conducted by either direct connection of a port to be charged to host system tank charging ports, or by tank exchange with a host system tank when the system is configured with multiple tank(s) and having quick-disconnect features.

The electrical recharging operation can be conducted by use of either a direct connection of a port to be charged to a host system connector including but not limited to conductive or inductive connectors, or by battery exchange with a host system battery when the system is configured with multiple batteries and having quick-disconnect features.

The transfer of cooling energy can be achieved by direct connection between a port to be charged and a host system thermal energy port included but not limited to by conductive, convective and radiative connection.

While exchanging information with users to be refueled and or to be recharged and or to transfer cooling energy and during the operation, a control subsystem 500 can be recording and logging all the data pertaining to this operation and the status of each step.

The various aspects and embodiments of systems and components described above can be combined to provide further embodiments, and modified to achieve the advantages set forth. In general, the terms used should not be construed to limit the invention to the specific embodiments disclosed, but should be construed to include all Hydro-Cool system configurations in accordance with the claims.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to the doctrine of equivalents and related doctrines.

Selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

What is claimed is:

1. An intelligent mobile environmental control system for a transport vehicle, comprising:

an energy subsystem comprising at least one fuel cell, at least one battery, and at least one energy subsystem heat exchanger;

a fluid conditioning subsystem comprising a refrigeration subsystem configured for use of energy provided by the energy subsystem to:

condition, using the energy provided by the energy subsystem, at least one physical attribute of a first conditioning fluid comprising a refrigerant in accordance with at least one conditioning instruction received from an environmental control subsystem to result in conditioned first conditioning fluid, and direct the conditioned first conditioning fluid to at least one cargo space environmental control subsystem heat exchanger of a cargo space environmental control subsystem;

wherein the cargo space environmental control subsystem heat exchanger is configured to use the conditioned first conditioning fluid to control an environment of a cargo space; and wherein the environmental control subsystem comprises at least one signal processing unit configured to generate the conditioning instruction based at least in part on signals representing at least one operating condition associated with the transport vehicle, wherein the signals representing at least one operating condition represent and are predictive of at least one ambient environmental condition, wherein the at least one conditioning instruction is based on the signals predictive of the at least one ambient environmental condition, wherein at least one of the fluid conditioning subsystem or the cargo space environmental control subsystem is configured to direct the conditioned first conditioning fluid or other conditioned conditioning fluid to the energy subsystem heat exchanger to control an environmental state of the at least one fuel cell of the energy subsystem.

2. The intelligent mobile environmental control system of claim 1, wherein the operating condition comprises at least one of a transport vehicle operating mode or an intelligent mobile environmental control system operating mode, wherein the signals representing at least one operating condition represent and are predictive of at least one predicted state or predicted mode of the transport vehicle.

3. The intelligent mobile environmental control system of claim 1, wherein the signals representing at least one operating condition represent at least one condition sensed by at least one sensor of the transport vehicle.

4. The intelligent mobile environmental control system of claim 3, wherein the at least one sensor comprises at least one of a positioning system, a speedometer, an anemometer, a wind indicator, an altitude sensor, a temperature sensor, a pressure sensor, a hygrometer, or a solar radiation Direct Normal Irradiation (DNI) pyrheliometer.

5. The intelligent mobile environmental control system of claim 1, wherein the signals representing at least one operating condition are received via an electronics communication network from a source located off board the transport vehicle.

6. The intelligent mobile environmental control system of claim 1, wherein the signals predictive of the at least one ambient environmental condition are of a predicted route of the transport vehicle.

7. The intelligent mobile environmental control system of claim 1, wherein the conditioning instruction comprises signals representing a stationary system recommendation when the cargo space is stationary.

8. The intelligent mobile environmental control system of claim 1, further comprising an ambient environmental fluid interface configured for thermal energy exchange between an ambient environment and at least the first conditioning fluid.

9. The intelligent mobile environmental control system of claim 1, wherein at least one of the fluid conditioning subsystem or the cargo space environmental control subsystem is configured to direct thermal energy to the energy subsystem for use in controlling an environmental state of at least one component of the energy subsystem.

10. The intelligent mobile environmental control system of claim 1, further comprising an ambient environmental fluid interface configured to mix conditioned fluid with ambient environmental fluid to result in mixed fluids and deliver the mixed fluids to at least one of the energy subsystem, the fluid conditioning subsystem, or the cargo space environmental control subsystem.

11. An intelligent mobile environmental control system for a transport vehicle, comprising:

an energy subsystem comprising at least one battery;

a fluid conditioning subsystem comprising a refrigeration subsystem configured for use of energy provided by the energy subsystem to:

condition, using the energy provided by the energy subsystem, at least one physical attribute of a conditioning fluid comprising a refrigerant in accordance with a conditioning instruction received from an environmental control subsystem to result in conditioned first conditioning fluid, and direct the conditioned first conditioning fluid to a cargo space environmental control subsystem heat exchanger of a cargo space environmental control subsystem;

wherein the cargo space environmental control subsystem heat exchanger is configured to use the conditioned first conditioning fluid to control an environment of a cargo space; and at least one signal processing unit configured to generate the conditioning instruction based at least in part on signals representing at least one operating condition associated with the transport vehicle, wherein at least one of the fluid conditioning subsystem or the cargo space environmental control subsystem is configured to direct thermal energy to the energy subsystem for use in controlling an environmental state of at least one component of the energy subsystem, wherein the signals representing at least one operating condition represent and are predictive of at least one ambient environmental condition, wherein the conditioning instruction is based on the signals predictive of the at least one ambient environmental condition.

12. The intelligent mobile environmental control system of claim 1, wherein the energy subsystem is configured to output oxygen depleted gases and direct the oxygen depleted gases to the cargo space environmental control subsystem.

13. The intelligent mobile environmental control system of claim 12, wherein the fluid conditioning subsystem comprises a catalytic combustor configured to perform flameless combustion using oxygen and output the oxygen depleted gases to the cargo space environmental control subsystem.

14. The intelligent mobile environmental control system of claim 1, wherein the energy subsystem is configured to draw electrical energy from the battery to account for reduction in electrical energy by the at least one fuel cell.

15. The intelligent mobile environmental control system of claim 1, further comprising an ambient environmental fluid interface configured for mixing an ambient environment with the environment of the cargo space to result in mixed fluids and deliver the mixed fluids to the at least one fuel cell.

16. The intelligent mobile environmental control system of claim 9, wherein the energy provided by the energy subsystem to condition the at least one physical attribute of the first conditioning fluid includes second thermal energy.

17. The intelligent mobile environmental control system of claim 16, wherein the second thermal energy provided by the energy subsystem to condition the at least one physical attribute of the first conditioning fluid and the thermal energy directed to the energy subsystem by the at least one of the fluid conditioning subsystem or the cargo space environmental control subsystem are in a loop.

18. The intelligent mobile environmental control system of claim 16, wherein the second thermal energy provided by the energy subsystem is used to perform defrosting of an evaporator of the environmental control subsystem.

19. A method for a transport vehicle, comprising:

operating an energy subsystem comprising at least one fuel cell, and at least one battery, and at least one energy subsystem heat exchanger;

using, by a fluid conditioning subsystem, energy provided by the energy subsystem to:

condition, using the energy provided by the energy subsystem, at least one physical attribute of a first conditioning fluid in accordance with at least one conditioning instruction received from an environmental control subsystem to result in conditioned first conditioning fluid; and direct the conditioned first conditioning fluid to at least one cargo space environmental control subsystem heat exchanger of a cargo space environmental control subsystem;

using, by the cargo space environmental control subsystem heat exchanger, the conditioned first conditioning fluid to control an environment of a cargo space;

generating, by an environmental control subsystem comprising at least one signal processing unit, the conditioning instruction based at least in part on signals representing at least one operating condition associated with the transport vehicle; and directing, using at least one of the fluid conditioning subsystem or the cargo space environmental control subsystem, the conditioned first conditioning fluid or other conditioned conditioning fluid to the energy subsystem heat exchanger to control an environmental state of the at least one fuel cell of the energy subsystem, wherein the signals representing at least one operating condition represent and are predictive of at least one ambient environmental condition, wherein the at least one conditioning instruction is based on the signals predictive of the at least one ambient environmental condition.

20. An intelligent mobile environmental control system for a transport vehicle, comprising:

an energy subsystem comprising at least one fuel cell and at least one battery;

a fluid conditioning subsystem comprising a refrigeration subsystem configured for use of energy provided by the energy subsystem to:

condition, using the energy provided by the energy subsystem, at least one physical attribute of a first conditioning fluid comprising a refrigerant in accordance with at least one conditioning instruction received from an environmental control subsystem to result in conditioned first conditioning fluid, and direct the conditioned first conditioning fluid to at least one cargo space environmental control subsystem heat exchanger of a cargo space environmental control subsystem;

the cargo space environmental control subsystem heat exchanger configured to use the conditioned first conditioning fluid to control an environment of a cargo space; and an ambient environmental fluid interface configured to mix conditioned fluid with ambient environmental fluid to result in mixed fluids and deliver the mixed fluids to at least one of the energy subsystem, the fluid conditioning subsystem, or the cargo space environmental control subsystem, wherein the environmental control subsystem comprises at least one signal processing unit configured to generate the conditioning instruction based at least in part on signals representing at least one operating condition associated with the transport vehicle, wherein the signals representing at least one operating condition represent and are predictive of at least one ambient environmental condition, wherein the at least one conditioning instruction is based on the signals predictive of the at least one ambient environmental condition.

21. An intelligent mobile environmental control system for a transport vehicle, comprising:

an energy subsystem comprising at least one fuel cell and at least one battery;

a fluid conditioning subsystem comprising a refrigeration subsystem configured for use of energy provided by the energy subsystem to:

condition, using the energy provided by the energy subsystem, at least one physical attribute of a first conditioning fluid comprising a refrigerant in accordance with at least one conditioning instruction received from an environmental control subsystem to result in conditioned first conditioning fluid, and direct the conditioned first conditioning fluid to at least one cargo space environmental control subsystem heat exchanger of a cargo space environmental control subsystem;

wherein the cargo space environmental control subsystem heat exchanger is configured to use the conditioned first conditioning fluid to control an environment of a cargo space; and wherein the environmental control subsystem comprises at least one signal processing unit configured to generate the conditioning instruction based at least in part on signals representing at least one operating condition associated with the transport vehicle, wherein the signals representing at least one operating condition represent and are predictive of at least one ambient environmental condition, wherein the at least one conditioning instruction is based on the signals predictive of the at least one ambient environmental condition, wherein the energy subsystem is configured to output oxygen depleted gases and direct the oxygen depleted gases to the cargo space environmental control subsystem.

22. The intelligent mobile environmental control system of claim 20, wherein the fluid conditioning subsystem comprises a catalytic combustor configured to perform flameless combustion using oxygen and output the oxygen depleted gases to the cargo space environmental control subsystem.

23. An intelligent mobile environmental control system for a transport vehicle, comprising:

an energy subsystem comprising at least one fuel cell and at least one battery;

a fluid conditioning subsystem comprising a refrigeration subsystem configured for use of energy provided by the energy subsystem to:

condition, using the energy provided by the energy subsystem, at least one physical attribute of a first conditioning fluid comprising a refrigerant in accordance with at least one conditioning instruction received from an environmental control subsystem to result in conditioned first conditioning fluid, and direct the conditioned first conditioning fluid to at least one cargo space environmental control subsystem heat exchanger of a cargo space environmental control subsystem;

wherein the cargo space environmental control subsystem heat exchanger is configured to use the conditioned first conditioning fluid to control an environment of a cargo space; and wherein the environmental control subsystem comprising at least one signal processing unit is configured to generate the conditioning instruction based at least in part on signals representing at least one operating condition associated with the transport vehicle, wherein the signals representing at least one operating condition represent and are predictive of at least one ambient environmental condition, wherein the at least one conditioning instruction is based on the signals predictive of the at least one ambient environmental condition, wherein the energy subsystem is configured to draw electrical energy from the battery to account for reduction in electrical energy by the at least one fuel cell.

24. An intelligent mobile environmental control system for a transport vehicle, comprising:

an energy subsystem comprising at least one fuel cell and at least one battery;

a fluid conditioning subsystem comprising a refrigeration subsystem configured for use of energy provided by the energy subsystem to:

condition, using the energy provided by the energy subsystem, at least one physical attribute of a first conditioning fluid comprising a refrigerant in accordance with at least one conditioning instruction received from an environmental control subsystem to result in conditioned first conditioning fluid, and direct the conditioned first conditioning fluid to at least one cargo space environmental control subsystem heat exchanger of a cargo space environmental control subsystem;

wherein the cargo space environmental control subsystem heat exchanger is configured to use the conditioned first conditioning fluid to control an environment of a cargo space; and an ambient environmental fluid interface configured for mixing an ambient environment with the environment of the cargo space to result in mixed fluids and deliver the mixed fluids to the at least one fuel cell, wherein the environmental control subsystem comprises at least one signal processing unit configured to generate the conditioning instruction based at least in part on signals representing at least one operating condition associated with the transport vehicle, wherein the signals representing at least one operating condition represent and are predictive of at least one ambient environmental condition, wherein the at least one conditioning instruction is based on the signals predictive of the at least one ambient environmental condition.

25. A processor configured to perform the method of claim 19.

26. The intelligent mobile environmental control system of claim 1, wherein the at least one fuel cell includes at least one hydrogen fuel cell.

* * * * *